(12) United States Patent
Hunt et al.

(10) Patent No.: US 10,680,886 B1
(45) Date of Patent: Jun. 9, 2020

(54) REMOTE WIRELESS SENSORS AND SYSTEMS INCLUDING REMOTE WIRELESS SENSORS

(71) Applicant: Schneider Electric Systems USA, Inc., Foxboro, MA (US)

(72) Inventors: Philip George Hunt, Bedford, MA (US); Mark V. Bertolina, Quincy, MA (US); Brooks Stevens Read, Concord, MA (US); Bruce Henry Thompson, New Orleans, LA (US); Richard Bruce McKinstry, Northborough, MA (US); Richard Allan Chaney, Nashua, NH (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 299 days.

(21) Appl. No.: 14/841,175

(22) Filed: Aug. 31, 2015

Related U.S. Application Data

(60) Provisional application No. 62/155,437, filed on Apr. 30, 2015, provisional application No. 62/043,896, filed on Aug. 29, 2014.

(51) Int. Cl.
*H04L 9/32* (2006.01)
*H04L 12/24* (2006.01)
(Continued)

(52) U.S. Cl.
CPC ........ *H04L 41/0816* (2013.01); *H04L 9/3247* (2013.01); *H04L 12/2807* (2013.01);
(Continued)

(58) Field of Classification Search
CPC ............. H04L 41/0816; H04L 63/0442; H04L 12/2807; H04L 67/12; H04L 9/3247; H04L 2012/2841
(Continued)

(56) References Cited

U.S. PATENT DOCUMENTS 5,001,755 A * 3/1991 Skret .................... H04L 12/403
380/37
7,136,710 B1 11/2006 Hoffberg et al.
(Continued)

FOREIGN PATENT DOCUMENTS

EP 2138919 12/2009
WO WO/2014/085755 6/2014

OTHER PUBLICATIONS https://en.wikipedia.org/wiki/One-time_pad.
(Continued)

*Primary Examiner* — Mohammad W Reza
(74) *Attorney, Agent, or Firm* — Locke Lord LLP

(57) ABSTRACT

A wireless sensor preferably has a case which is intrinsically safe and has no exposed parts which can become not intrinsically safe due to the passage of time or through contact with chemicals typically encountered in a location where the wireless sensor is used. It preferably has no integral visual display other than lights, and it preferably includes at least one signal light. The sensor preferably includes a wireless transceiver for allowing remote read and remote control of the sensor. The sensor preferably includes piezoelectric pressure detectors for allowing a user to locally interact with the sensor by pressing on the case. Data can be automatically harvested from the sensors by a portable electronic data-retrieving device which is usually geographically remote from the sensors when the portable electronic data-retrieving device and the sensors are in range of a wireless system which allows them to communicate when they are geographically proximate each other.

4 Claims, 34 Drawing Sheets

(51) Int. Cl.
  *H04L 29/08* (2006.01)
  *H04L 12/28* (2006.01)
  *H04L 29/06* (2006.01)
(52) U.S. Cl.
  CPC .......... *H04L 63/0442* (2013.01); *H04L 67/12* (2013.01); *H04L 2012/2841* (2013.01)
(58) Field of Classification Search
  USPC ....................................................... 713/176
  See application file for complete search history.

(56) References Cited

U.S. PATENT DOCUMENTS

| | | | |
|---|---|---|---|
| 7,595,723 B2 | 9/2009 | Heitzmann et al. | |
| 8,373,581 B2 | 2/2013 | Hassan et al. | |
| 8,578,473 B2 | 11/2013 | Sadler | |
| 8,594,467 B2 | 11/2013 | Lu et al. | |
| 8,594,938 B2 | 11/2013 | Guglielmo et al. | |
| 8,650,411 B2 | 2/2014 | Feight et al. | |
| 2005/0111366 A1* | 5/2005 | Whittaker Stewart | H04L 45/48 370/235 |
| 2006/0053336 A1* | 3/2006 | Pomaranski | H04L 12/437 714/47.1 |
| 2006/0212557 A1 | 9/2006 | Rieger et al. | |
| 2006/0221856 A1* | 10/2006 | Quiroz | H04W 84/20 370/254 |
| 2010/0246811 A1 | 9/2010 | Sadler | |
| 2012/0236768 A1* | 9/2012 | Kolavennu | H04L 69/08 370/310 |
| 2014/0032937 A1 | 1/2014 | Sadler | |
| 2015/0351084 A1* | 12/2015 | Werb | H04W 12/08 370/329 |

OTHER PUBLICATIONS http://www.mils.com/uploads/media/TEC-OTP-04e-h.pdf.
http://www.trumpetpower.com/Papers/Crypto/OTP.
http://www.csjournals.com/IJCSC/PDF1-1/50.pdf.
http://security.stackexchange.com/questions/81462/can-you-say-that-since-one-timepadencryption-is-unbreakable-it-is-the-best-if.
http://users.telenet.be/d.rijmenants/papers/is_one_time_pad_history.pdf.

* cited by examiner

Walkin' Backhaul
Augmented Reality

Data Transferred to Client Cloud

Wellhead Example
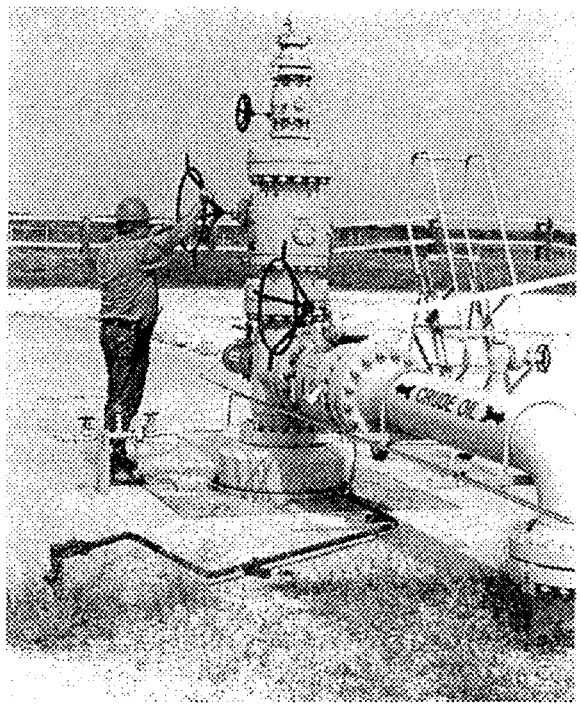
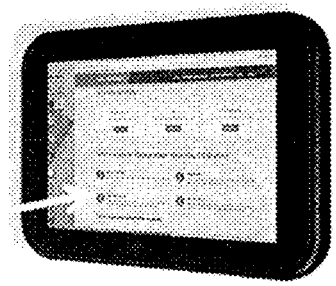
Read as example:
Chemical inventory
Total Gallons Dispensed
Avg Computed Flowrate
Max Computed Flowrate
Pump Run time
Pump Pressure
Process Pressure
NC Device PV
NC Proprietary Algorithms
FIG. 18

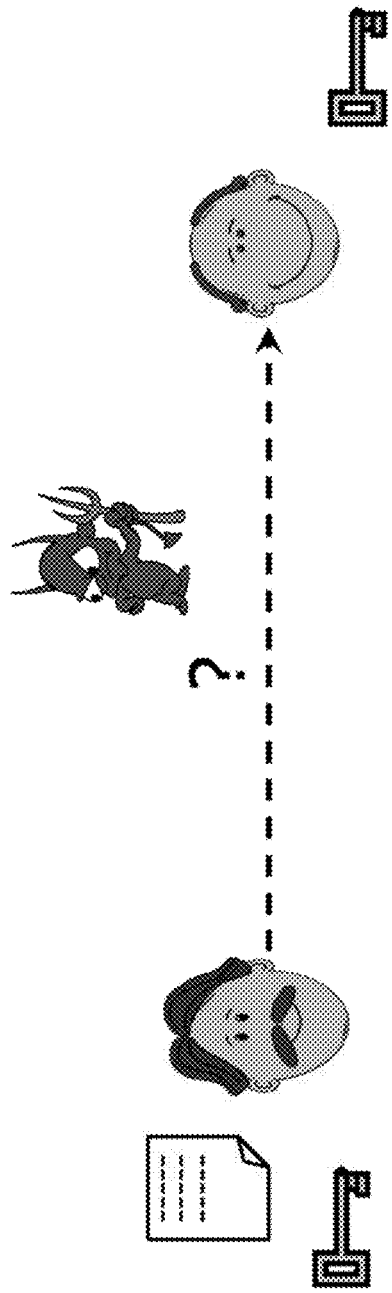

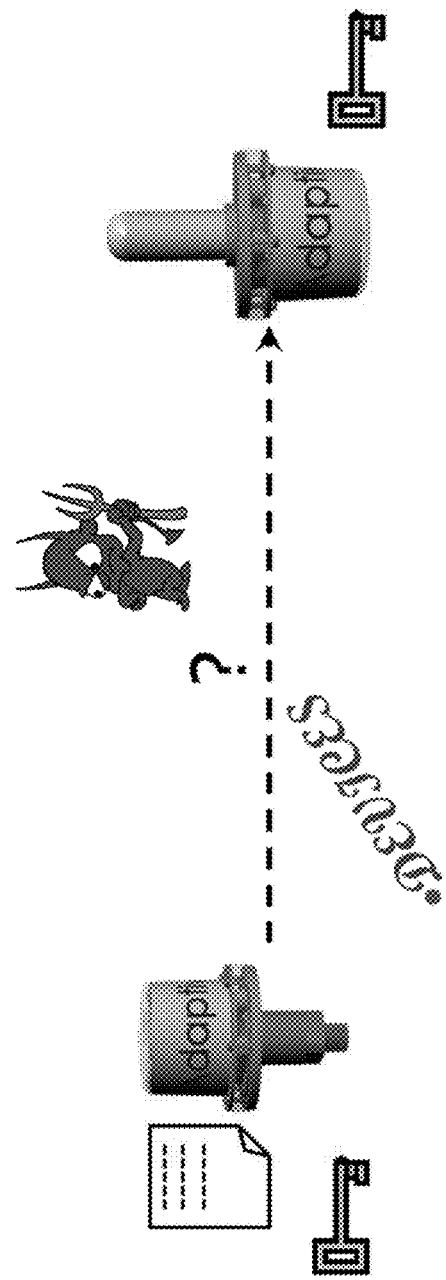

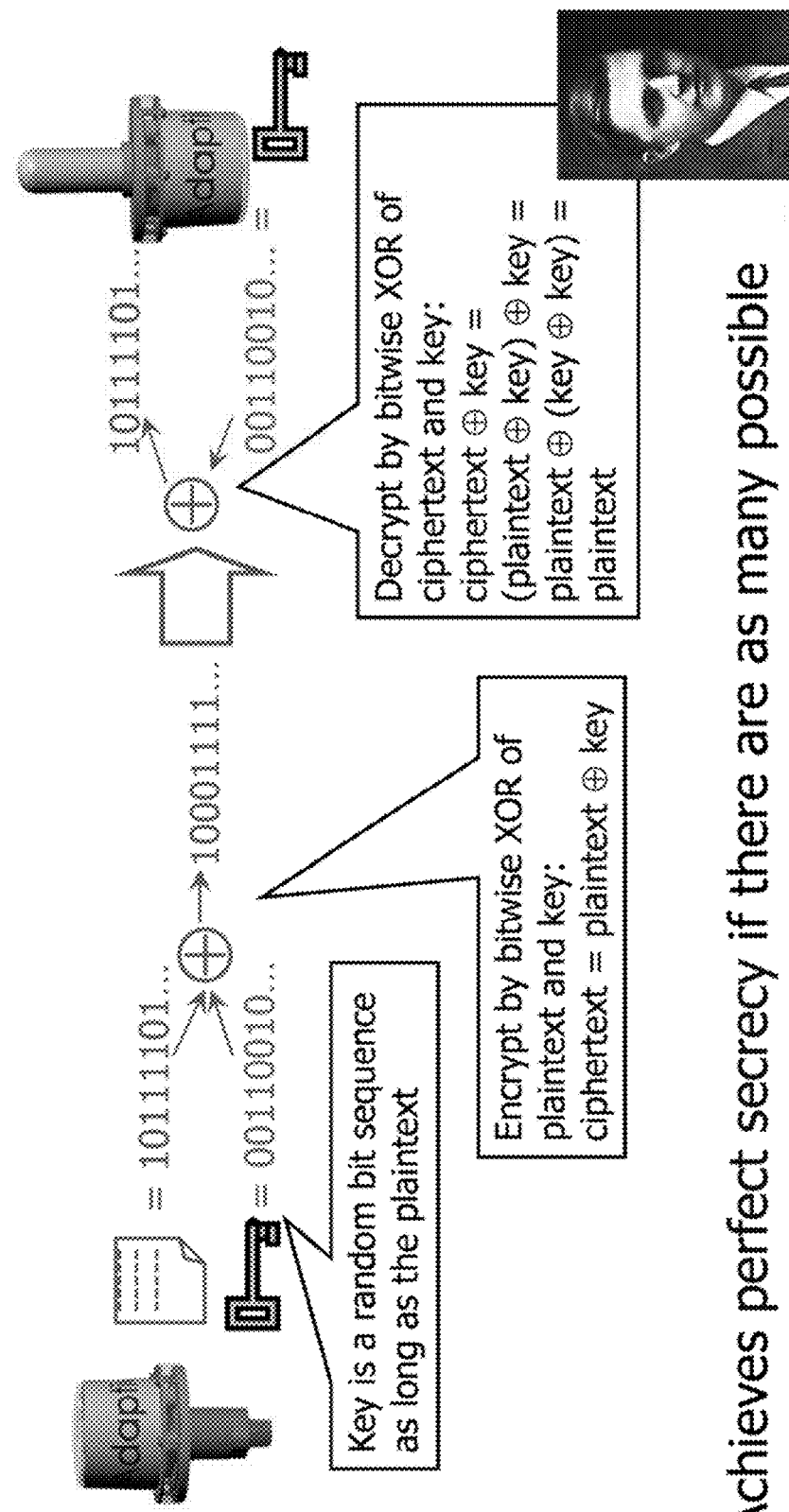

Fig. 22

Advantages of One-Time Pad

◆ Easy to compute
  • Encryption and decryption are the same operation
  • Bitwise XOR is very cheap and fast ◆ As secure as theoretically possible
  • Given a cipher text, all plaintexts are equally likely, regardless of attacker's computational resources
  • ...<u>if and only if</u> the key sequence is truly random
  • ...<u>if and only if</u> each key is as long as the plaintext
  — But how do the sender and the receiver communicate the key to each other?

slide 4

Fig. 23

Problems with One-Time Pad

- ◆ Key must be as long as the plaintext
  - Impractical in most real world scenarios
  - Still used for diplomatic and intelligence traffic
- ◆ Does not guarantee integrity
  - One-time pad guarantees confidentiality
  - Attacker could change message
- ◆ Insecure if keys are reused
  - Attacker could obtain XOR of plaintexts slide 5

Fig. 26

Integrity Solved

◆ AWS Ultra Security™:
- 1) Each bit encrypted bit for bit from OTP
- 2) Key never re-used
- 3) Digital Signature - every message
- 4) Configuration Signature – every message, ANY changes flagged
- 5) Life Time Trace™ (LTT) – ALL messages for life of instrument slide 8

Fig. 28

APPENDIX

- Original Patent on OTP
- Model day use of OTP
- Physical Distribution of OTPs
- Complexity of implementing OTP
- Alternative approach due to OTP Difficulty
- Contemporary Discussions on OPT Difficulty
- Patents on OTP
- Why OTP not secure in Modern Computers slide 10

Fig. 29

Original Patent of OTP

- First described by Frank Miller in 1882, [5][6] the one-time pad was re-invented in 1917. On July 22, 1919, U.S. Patent 1,310,719 was issued to Gilbert S. Vernam for the XOR operation used for the encryption of a one-time pad. [7]

- https://en.wikipedia.org/wiki/One-time_pad slide 11

Fig. 30

Model day use of OTP

- http://www.mils.com/uploads/media/TEC-OTP-04e-h.pdf slide 12

Fig. 31

Physical Distribution of OTPs

- http://w3.antd.nist.gov/pubs/Mink-SPIE-One-Time-Pad-6244_22.pdf slide 13

Fig. 32

Complexity of implementing OTP

- http://www.trumpetpower.com/Papers/Crypto/OTP slide 14

Fig. 33

Alternative approach due to OTP difficulty

- http://www.csjournals.com/IJCSC/PDF1-1/50.pdf slide 15

Fig. 34

Contemporary Discussions on Difficulty to OPT

- http://security.stackexchange.com/questions/81462/can-you-say-that-since-one-time-pad-encryption-is-unbreakable-it-is-the-best-if slide 10

Fig. 35

OTP Patents

- Patent relates to generation of or verification of Password using a OTP – does not encrypt all messages for life
- US2014003297 A1 Filing date Oct 1, 2013
- US8578473 B2 Filing date Mar 25, 2009
- US20100246811 A1 Filing date Mar 25, 2009 slide 17

Fig. 36

Explanation of why OTP is not secure in Modern Computers

◆ http://users.telenet.be/d.rijmenants/papers/is_one_time_pad_history.pdf slide 18

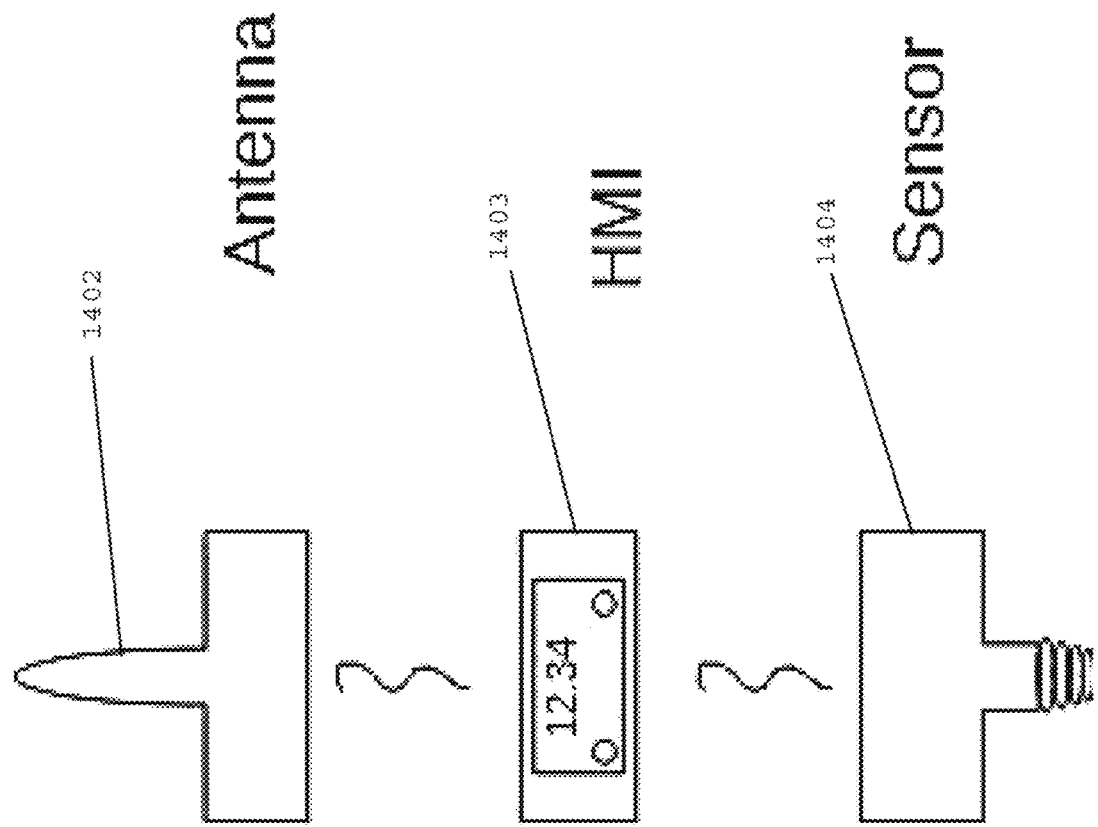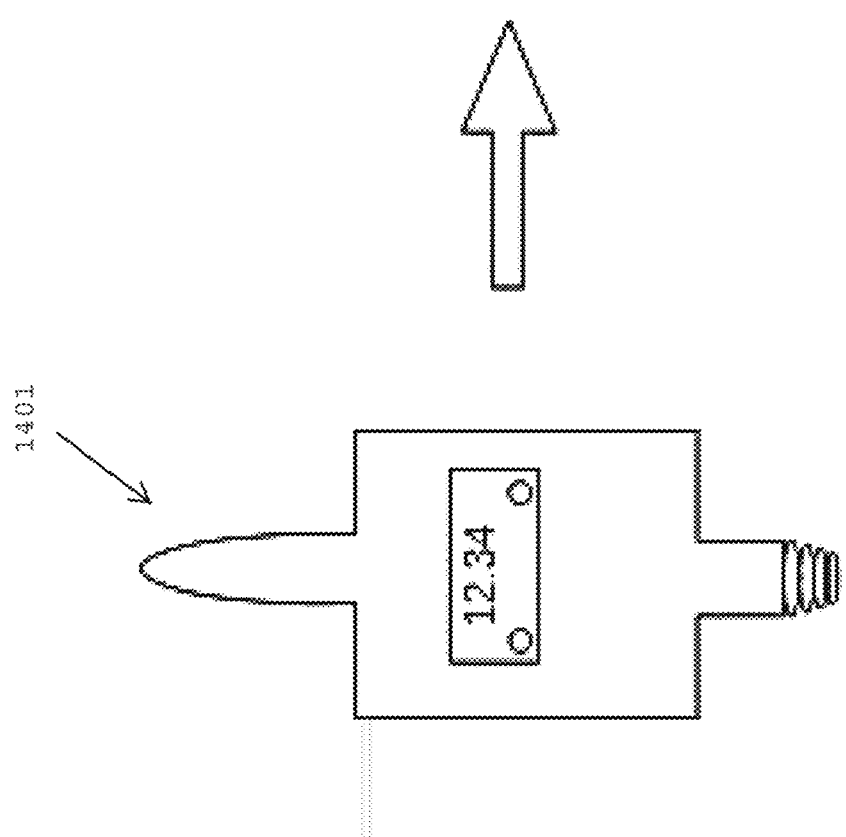
Fig. 37

2ⁿᵈ step, Installation of the OTP
COPY into store @ endpoint

REMOTE WIRELESS SENSORS AND SYSTEMS INCLUDING REMOTE WIRELESS SENSORS

CROSS-REFERENCE TO RELATED APPLICATIONS

This application claims the benefit of U.S. Provisional Patent Application Ser. No. 62/155,437, filed 30 Apr. 2015; and, U.S. Provisional Patent Application Ser. No. 62/043,896, filed 29 Aug. 2014, both of which are incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to remote sensors. More particularly, the present invention relates to remote wireless sensors and systems including remote wireless sensors.

2. General Background of the Invention

In the global Wireless Industrial Sensor Network (WISM) market, there are many different standards and protocols, including for example Wireless HART (Highway Addressable Remote Transducer Protocol), ISA 100 standards, Bluetooth LE, Zigbee, ISM global standards, latencies, redundancy, and star and mesh topographies). Programming of sensor systems involving these different standards and protocols is a difficult task. Instruction manuals are often dozens or hundreds of pages long.

Advances in wireless technology include such features as wireless remote control of a Bluetooth headset with an iPhone, including the ability to see a display on the iPhone of the available power of the battery in the headset, and an ability to adjust the volume on the headset with buttons on the iPhone. Also, there are hearing aids now which have a wireless remote control to change settings on the hearing aid. Such advances typically have not transferred to the industrial wireless sensor market.

The following patent documents are incorporated herein by reference.

U.S. Pat. No. 7,595,723 for "Wireless communication protocol for a medical sensor system" which discloses a wireless communication system for medical sensor data. This communications system includes a portable unit that connects to a wireless sensor and a monitor unit that connects to a sensor monitor. Once activated, the units will self-organize into a wireless communication structure controlled by the portable unit. As other pairs of units activate, they can self-organize their transmissions by joining an existing network or by creating new networks;

WIPO Published Patent Application WO/2014/085755 A1 for "METHOD FOR TEMPERATURE-BASED BATTERY CONSERVATION IN A WIRELESS SENSOR DEVICE" which discloses a device, system, and method for wirelessly communicating a fuel level of a fuel tank to a TRS controller. The electronics of the fuel level sensor, which include a temperature sensor for measuring ambient temperature, are completely sealed and protected from the elements. The fuel level sensor can quickly connect and disconnect to a mechanical floater assembly and/or a fuel tank;

U.S. Pat. No. 8,650,411 for "Energy management for an electronic device" discloses energy management of an electronic device using multiple electric power sources. The electric power sources may include a parasitic electric power source, a rechargeable electric power source, an intermittent electric power source, and a continuous electric power source. The electronic device further may include a power supply for receiving the electric power from the source(s) and supplying electric power to the various components of the electronic device that require power. The electronic device may include a source selector for controlling which power source supplies electric power to the power supply. Energy management of the electronic device may be configured to use a permanently exhaustible power source such as a battery only when other power sources are unavailable.

U.S. Pat. No. 8,594,467 for "Interactive virtual display system for ubiquitous devices" discloses an interactive virtual display, which provides various systems and techniques that facilitate ubiquitous user interaction with both local and remote heterogeneous computing devices. More specifically, the Interactive Virtual Display uses various combinations of small-size programmable hardware and portable or wearable sensors to enable any display surface (e.g., computer display devices, televisions, projected images/video from projection devices, etc.) to act as a thin client for users to interact with a plurality heterogeneous computing devices regardless of where those devices are located relative to the user. The Interactive Virtual Display provides a flexible system architecture that enables communication and collaboration between a plurality of both local and remote heterogeneous computing devices. This communication and collaboration enables a variety of techniques, such as adaptive screen compression, user interface virtualization, real-time gesture detection to improve system performance and overall user experience, etc.

U.S. Pat. No. 8,594,938 for "Systems and methods for collecting, analyzing, recording, and transmitting fluid hydrocarbon production monitoring and control data" discloses systems and methods for collecting, analyzing, transmitting, and acting on information collected from instruments monitoring and controlling equipment used for natural gas well production collection and pipeline insertion platforms (skids). Said instruments may include handheld computing devices like the Apple iPhone, iPad, or other PDAs; said devices using short or long range, wired or wireless communication. The systems and methods reportedly reduce costs, errors, inefficiencies, and increase safety by giving the user simple GUI interfaces for data collection and for action items. The handheld devices can guide the data collector to the skid location using GPS or other location based services, collect data via wired or wireless methods, guide the data collector through manual data input methods or safety action items, compare current readings to past history and evaluate current safety or out-of-tolerance conditions or entries, among other items.

U.S. Pat. No. 8,373,581 for "Mobile control node system and method for vehicles" discloses a mobile control node system and method for a vehicle (630), in which the mobile control node (624) can interact, via a bi-directional radio link (642), with a transceiver processor unit (628) in the vehicle. The transceiver processor unit (628) is connected to a vehicle control system (120) and allows the mobile control node (624) to function as an input and output node on a vehicle control network (632), allowing remote control of the vehicle and providing functions such as remote or passive keyless entry. Additionally, the system provides a vehicle location function wherein the range and bearing between the mobile control node (624) and the vehicle (630) can be determined and displayed on the mobile control node (624). The range and bearing are calculated by determining the range between the mobile control node (624) and vehicle (630), preferably using a time of flight methodology, and by processing the travel distance of the mobile control node and compass data in order to triangulate the position of the vehicle (630) relative to the mobile control node (624).

U.S. Pat. No. 7,136,710 for "Ergonomic man-machine interface incorporating adaptive pattern recognition based control system" discloses an adaptive interface for a programmable system, for predicting a desired user function, based on user history, as well as machine internal status and context. The apparatus receives an input from the user and other data. A predicted input is presented for confirmation by the user, and the predictive mechanism is updated based on this feedback. Also provided is a pattern recognition system for a multimedia device, wherein a user input is matched to a video stream on a conceptual basis, allowing inexact programming of a multimedia device. The system analyzes a data stream for correspondence with a data pattern for processing and storage. The data stream is subjected to adaptive pattern recognition to extract features of interest to provide a highly compressed representation which may be efficiently processed to determine correspondence. Applications of the interface and system include a VCR, medical device, vehicle control system, audio device, environmental control system, securities trading terminal, and smart house. The system optionally includes an actuator for effecting the environment of operation, allowing closed-loop feedback operation and automated learning.

The following references are incorporated herein by reference:

https://en.wikipedia.org/wiki/One-time_pad
http://www.mils.com/uploads/media/TEC-OTP-04e-h.pdf
http://w3.antd.nist.gov/pubs/Mink-SPIE-OneTime-Pad-6244_22.pdf
http://www.trumpetpower.com/Papers/Crypto/OTP
http://www.csjournals.com/IJCSC/PDF1-1/50.pdf
http://security.stackexchange.com/questions/81462/can-you-say-that-since-one-time-padencryption-is-unbreakable-it-is-the-best-if
http://users.telenet.be/d.rijmenants/papers/is_one_time_padhistory.pdf The following US Patents and Patent publications are incorporated herein by reference: 8,578,473; 2014/32937; 2010/246811; 2006/212557. European patent application EP2138919 is incorporated herein by reference.

US Patent Publication No. 2006/212557 mentions wireless linked HMI's (human machine interfaces), but in the context of SCADA systems and is focused on security. It does not systematically identify the three major sections of a wireless instrument, the sensor, the WSN antenna, and the HMI as disclosed in the method of partitioning of complexity in wireless instrumentation enclosures invention herein.

European Patent Application EP2138919 identifies separating the sensor, only from the wireless instrument. It is presented as a convenient way to change the battery, but the wireless instrument does not function while the sensor part is detached. Conversely, the method of partitioning of complexity in wireless instrumentation enclosures invention disclosed herein separates the functions of a wireless instrument into three physical parts, and allows them to fully function collectively as a wireless instrument while physically separated.

BRIEF SUMMARY OF THE INVENTION

The present invention includes a system for making interconnectivity of instruments both easier and more secure than in the prior art, and includes instruments which are more robust than in the prior art.

The apparatus of the present invention include a wireless sensor:
 having a case which is intrinsically safe and has no exposed parts which can become not intrinsically safe due to the passage of time or through contact with chemicals typically encountered in a location where the wireless sensor is used;
 having no integral visual display other than lights;
 including at least one signal light;
 including a wireless transceiver for allowing remote read and remote control of the sensor; and
 including piezoelectric pressure detectors for allowing a user to locally interact with the sensor by pressing on the case.

Preferably a system includes a plurality of such wireless sensors.

Preferably, there is a first battery hermetically sealed in the sensor and a second battery external of the case.

Preferably, the sensor is powered from the second battery when the second battery has sufficient charge to power the sensor.

Preferably, the sensor sends a signal when the second battery does not have sufficient charge to power the sensor.

Preferably, the sensor sends a signal when the second battery reaches a predetermined amount of charge.

Preferably, the case comprises stainless steel and glass.

Preferably, the sensor includes circuitry to allow it to wirelessly display information on a device remote from it and to be wirelessly controlled by the device.

Preferably, the sensor includes no buttons which penetrate the sensor case.

Preferably, the case of the sensor includes a glass top, a stainless steel base, and a seal for hermetically sealing the glass top to the stainless steel base.

The present invention also includes a method of monitoring and controlling operations in an industrial plant, comprising using the apparatus described above to gather data and transmit instructions.

The present invention also includes apparatus including a wireless sensor:
 having a case made of stainless steel and glass;
 having no integral visual display other than lights;
 including at least one signal light;
 including a wireless transceiver for allowing remote read and remote control of the sensor; and
 including piezoelectric pressure detectors for allowing a user to locally interact with the sensor by pressing on the case.

Preferably a system includes a plurality of such wireless sensors.

Preferably, there is a first battery hermetically sealed in the sensor and a second battery external of the case.

Preferably, the sensor is powered from the second battery when the second battery has sufficient charge to power the sensor.

Preferably, the sensor sends a signal when the second battery does not have sufficient charge to power the sensor.

Preferably, the sensor sends a signal when the second battery reaches a predetermined amount of charge.

Preferably, the case comprises stainless steel and glass.

Preferably, the sensor includes circuitry to allow it to wirelessly display information on a device remote from it and to be wirelessly controlled by the device.

Preferably, the sensor includes no buttons which penetrate the sensor case.

Preferably, the case of the sensor includes a glass top, a stainless steel base, and a seal for hermetically sealing the glass top to the stainless steel base.

The present invention also includes a method of monitoring and controlling operations in an industrial plant, comprising using the apparatus described above to gather data and transmit instructions.

The present invention also includes a method of transceiving verifiable information comprising:

creating a message which includes (a) data recorded by a first instrument and (b) information about the first instrument;

transmitting the message to a second instrument;

extracting from the message the data recorded by the first instrument and the information about the first instrument;

using the data recorded by the first instrument and the information about the first instrument to verify that the data read value is both correct and correctly calculated.

Preferably, the information about the first instrument is compressed to a smaller representational tag, and the tag is different even for minimal (down to 1 binary digit (hereinafter "bit")) changes in the information. Preferably, the tag includes at least one of the following: a device serial number, a device revision, the date and time, and the ID of the last person to change the environment of the first instrument.

The present invention also includes a method of transcribing digitally signed messages, comprising:

creating public keys and private keys for instruments and computers and recording them in a repository, where each instrument or computer can access only its own private keys, but can access all public keys;

digitally signing a message from an instrument or computer by taking the message along with the private key of the instrument or computer to encrypt the message, then taking the intended recipient's public key from the repository, and encrypting the result of the first encryption (stage1) using that public key make stage 2 (this constitutes a signing of the message);

sending the Stage 2 message to another instrument or computer;

decrypting the message at the other instrument or computer by using the private key of the other instrument or computer to unencrypt the stage 2 message into a stage 1 message undoing the last encryption that was done (which was done using the recipient's public key so his own private key undoes this);

the other instrument or computer then tries the public key of the possible senders (a list he maintains) each in turn on the stage 1 message and finds only the transmitter's public key works (since the transmitter's private key encrypted the message into stage 1), which undoes stage 1 and provides clear (unencrypted) text.

The present invention includes a method of adding nodes to a network while minimally disrupting the network, comprising:

having several instruments represented as sub-instruments of one (as seen from Wireless HART) to allow for those sub-instruments to be functionally added or removed (indeed even moved) without interference to the network topology solutions and therefore without time or energy spent on finding new ones, by setting instruments to connect to a master device (the control controller or CC) so that device presents these sub-instruments to the network but does not present their added pathways or topology elements, but instead the network sees sub-instruments on the same node it already understands (the CC) and has already provisioned and adapted to as a network as a whole.

Preferably, when devices connected to the CC come or go the wireless HART infrastructure sees no topology changes at all, and instead it sees only sub-instruments added or removed from one node it already understands, such that instruments are added and removed at will without costly and time consuming network topology/route readjustments.

The present invention includes a method of visually signaling successful joining a node to a set or successful leaving of a set by a node, comprising the following: a first node wishing to join a set of nodes flashes by itself three times, then the set of nodes it wishes to join flashes together, but out of sync with the first node, which flashes alternately with the set, four times, then the first node flashes in sync with the set of nodes to signal a successful joining of the node to the set. Preferably, wherein when a node wishes to leave the set of nodes, all members of the set flash together three times, then the node wishing to leave the set flashes out of sync with the remaining nodes in the set, which flash in sync with one another, four times, then the remaining nodes in the set all stop flashing and the unjoined member flashes alone for 3 more times then activity stops.

The present invention also includes a system in which data can be automatically harvested from the sensors by a portable electronic data-retrieving device which is usually geographically remote from the sensors when the portable electronic data-retrieving device and the sensors are in range of a wireless system which allows them to communicate when they are geographically proximate each other.

The present invention also includes a method of partitioning of complexity in wireless instrumentation enclosures. A typical wireless instrument contains all functionality within a single enclosure, or routes via cables to external I/O such as antennae to a wireless sensor network (WSN), sensors, human machine interface (HMI)s. If an item cannot be placed in the optimal location, for example the antenna, the current state of the art is to place an additional entire instrument and use approaches such as wireless mesh networking. The installer is constantly caught balancing the tradeoffs of placing the sensor, antenna, and HMI is their respective optimal locations while minimizing the cost of cabling to remote mountings of each. The major roles of a wireless instrument are identified and instead incarnated as three physically separate devices, communicating via radio. This partitioning into the sensor, the WSN antenna, and the HMI allows many advantages to the installer, user, and manufacturer.

BRIEF DESCRIPTION OF THE SEVERAL VIEWS OF THE DRAWINGS

For a further understanding of the nature, objects, and advantages of the present invention, reference should be had to the following detailed description, read in conjunction with the drawings, wherein:

FIG. 18 shows a wellhead example using of a preferred embodiment of the present invention;

FIGS. 19-27 are a slide presentation showing how of a preferred embodiment of the present invention is used to improve how messages are sent in order to preserve confidentiality;

FIGS. 28-36 show references for prior art, each of which is incorporated herein by reference;

FIG. 37 shows on the left a conventional wireless instrument design with all functions integral, and then an implementation of the new invention where functionality is partitioned into three separate units, communicating wirelessly;

DETAILED DESCRIPTION OF THE INVENTION

Figure 1:
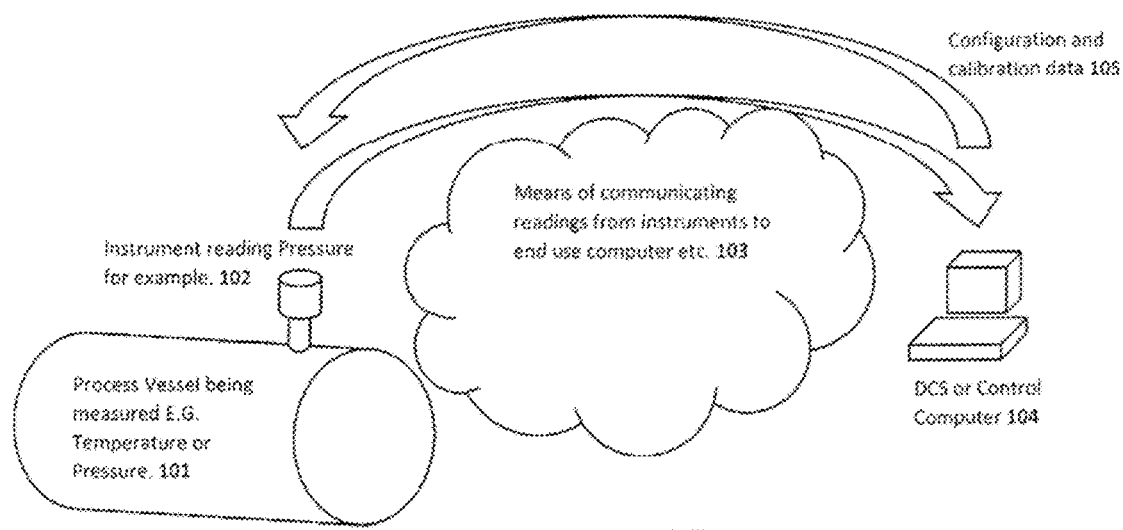
FIG. 1 represents an overall picture of operation of a preferred embodiment of the present invention as used in an industrial measurement setting.

The apparatus of the present invention includes a system and apparatus for wirelessly gathering and storing data from multiple geographic locations in a relatively simple manner.

Overview of AWS New Product System

The present invention includes a new series of products which features a deep and comprehensive set of new philosophies designed to achieve specific and concrete design initiatives. Primary among these initiatives is the goal of comprehensive "ease of use" (EOU from here on). There are many reasons for this which serve as the background and drivers for placing such value on EOU.

Drivers of EOU Initiative

1) Aging work force (AWF). In the target industries of the assignee, there is a lack of younger talent being recruited which leads to a crisis of expertise around two areas. First on the retirement of experienced personnel and second on expansion of sites (possibly in different regions) while a company is growing. Both these are helped if the products' feature set is design for rapid assimilation into the working environment by not requiring retraining, or any difficult to operate interface.

2) Complexity increase (CI+). Industry is using and designing greater levels of complexity into products daily. The reason CI+ is common is that developers do not spend nearly the same levels of effort and creativity on removing CI+, as they do on designing of that new function in the first place. New functionality gets added in the least cost, and quickest manner, inevitably. This results in new designs passing the burden of handling the new functionality configuration and operation, to the user. The user is ill equipped in skills or time to handle this extra load. Most designers are blissfully unaware that they have even done this, and certainly their managers rarely value the investment in time and effort (indeed in sheer creativity) required to fix the issue. Most users are not interested in how clever a new function is – they are interested in how to quickly, easily and naturally use it for a real benefit.

3) The lack of time to read the manual (RTM--). Even if a company produces a well written guide to new functionality they are not necessarily producing any EOU++ value. They are simply offering an already over-stressed user the opportunity to read an enormous tome called the "manual" and to do it in what is their "spare time." Recently one of the inventors reviewed the manual from Emerson on configuring security for Wireless Hart nodes—it was over 250 pages long. RTM-- is a symptom of the modern workplace. Users are told "don't waste time reading that thing, get on with the job!" Either we write a real manual that is helpful (one can tell when this occurs by the dog-eared pages with hand-written notes and the worn cover of such a manual) or make the product not need one at all. One should use EOU++ to find a better way, a natural way, a simple way and a zero time learning way of conveying the methods/knowledge needed.
4) Preferably the apparatus of the present invention is designed such that a user can see in a simple way how to order what apparatus he wants (EOU++ for ordering codes for example). He (or she) sees how to buy their needed instruments simply and quickly with a minimum of fuss. That is EOU++ for the assignee's processes, coding, and product descriptions.

So that is the background to the assignee's EOU initiative.

Next Level of Approach to Making EOU++

In no particular order, what follows is the next level of thought process and creative approaches to EOU++. At the onset of the design process the inventors looked at the following areas.
1) Ordering—could the inventors make the ordering process have greater EOU to be EOU++? Why? Well today's ordering process is typically long winded and frankly bewildering to most inexperienced users. They face the same situation as a new car buyer approaching a manufacturer that thinks it's neat to let them choose everything on the car. It's well-intentioned but a serious issue for the user facing time pressures. Who really wants to look at hundreds of choices for dozens of parameters while trying to order something right now? That right now, could be because their production is stopped dead. If so the value of choice and flexibility signaled by a product matrix in the dozens (or more) of entries is lost. In fact it's negative. The inventors have constructed mechanisms and creative approaches to this issue. The balance of choice versus time and effort to pick a choice, is critical. An answer embodied in the present invention lies in producing products that cover the widest possible range of user needs in one embodiment, and then having the smallest set of variables that covers the rest.
2) Installation. Why should it take three different skill sets to install an instrument? Can one reduce this to one if it all possible? The present inventors have found ways to eliminate the conduit needed in internode wiring often used for other company's gear. And the present inventors have found ways to eliminate even the electrical installer in many situations. Giving the essential part is still there (someone must move the unit into place and complete its mounting) the installation can get as low as it gets in skill set needs.
3) Commissioning. The present inventors have found ways of making the commissioning of new gear nearly "trivial" and almost training-free. In the normal approach commissioning is a multiple step process fraught with error. Any mistake in commissioning can be difficult to trace and correct. For the EOU++ products that the present inventors have invented, commissioning is reduced to the minimum required on site (an association step of node to central controller) and all other more detailed operations can be performed over the wireless link from the comfort and safety of the control room by personnel trained in these steps. Such a scheme maximizes the usage of the trained skilled operator in the control room, to the essential and non-removable sections of commissioning. The present invention's EOU++ commissioning uses relatively unskilled labor for all but the important steps.
4) Product lifetime as a holistic view. Adding the design philosophy (EOU++) to ordering represents one segment of this, indeed it can be added to all the others too, to installation, to maintenance, to usage, to obsolescence, and even to disposal. This is to make the entire lifetime easier to deal with. The present inventors want every step to be easier, for every step to be as natural and as simple as possible.
5) Separation of functions. Present prior art equipment from is typically designed to use a single package to contain the three components of the design: first the process reading sensor and electronics for the A/D convertor, secondly the HMI (human-machine interface) buttons and display to provide for configuration and change of parameters, and lastly the radio antenna (usually at the top of the case). Sometimes other designers have acquiesced to having a "remote-able" antenna connected over a long coaxial cable—other times they have done the same with the sensor read point via another cable. At best this solution looks like a long "rope" of cable with a sensor at one end, an antenna high point mounted at the other and an electronics package with HMI somewhere in the middle.

The approach of the present invention is to disconnect that cable altogether (with its attendant costs and installation problems) and truly disconnect the three elements enabling them to be place exactly where they should be. We have an electronic sensor (end node), a central controller (with antenna attached) which can "collect" from up to 8 end nodes, and a HMI on a hand-held tablet-like device that walks in and out again from the space as needed—or a semi-permanent display left in the area (again positioned best for the user) as needed. This separation enables each to be placed where needed—on the process, in an easy accessible spot for HMI interactions (or walk in/out again), and high up physically for the antenna.

The present invention preferably uses Bluetooth technology (which could be almost any radio link) to "connect" the nodes together. By allowing up to 8 end nodes on one central controller (CC) the present inventors have further lowered the cost if one has more than one variable to read at or close to that first site—which is a very common occurrence.

Specific Areas

The following are specific inventions based on the general philosophy outlined so far, and part of the whole approach.

Packaging Concepts

Force sensor means less complexity/cost and less ingress of $H_2O$ etc.

The present inventors have designed a force sensor arrangement to detect user input for HMI events and to wake the system from sleep (low power mode) to a more power-hungry awake and processing state. The present invention cannot easily entirely eliminate the need for some form of a button on the unit (see descriptions of associations later), but the present invention can eliminate the drawbacks of buttons. Using the force sensor invention is a means of avoiding having any pass-through from the outside to the inside of the case. Pass-throughs allow ingress from dust, liquids, gases etc. and are themselves in need of sealing mechanisms which become unreliable with age.

In the past designers have gone to lengths to solve these issues with magnetic arrangements, or with sealed pass-through mechanical arrangements. These too are not good solutions for a variety of reasons (losing magnets, wear and tear, cost etc.). And if one wants truly rugged gear with thick material walls (for XP reasons) the problem gets worse. The present inventors asked "can we detect a "push" on the case without actual buttons at all?" even if the case is thin 316L stainless steel.

At first thoughts (obvious ones) having a solid stainless steel base as part of the case makes the prospect of detecting a push on that case nearly impossible (a push from a hand without lots of force), as the case is not exactly flexible. The present invention first ignores that mental barrier to thinking of a solution and asks "Why can't we?". To detect such a push is entirely unobvious. It requires understanding that the metal base does indeed flex under such tiny loads albeit in micro inches—and that this is sufficient when coupled with the right sensor technology.

Such a sensor technology is piezoelectric sensors used in a new way. Piezoelectric crystals produce voltages from stress/strains—but these voltages are based on tiny amounts of charge (meaning low current drive and low power generation). So to imagine that the inventors could both detect this tiny movement and to use it to awake the processor (from its own low power mode) is a new idea. The present invention accomplishes this though a combination of clever circuit design (low power itself, or it could defeat the purpose) and incorporating a mixed filter (partly in the hardware and partly in software) to help minimize false awake signals from say vibrations for example.

Summary—the force sensor is simply a deflection detection on the case itself—it uses clever piezoelectric sensors in special configurations (orthogonal to each other to detect any direction of push) along with filtering in HW (hardware) and SW (software) to awake the processor for HMI input—and it does so while consuming a tiny amount of ongoing power.

Minimal Variation in Materials for Use in Industry (Ordering Complexity Minimization)

This is another EOU++ feature. Whenever users are faced with picking sensors or instruments for industrial uses they have a multitude of parameters to consider—among these are the materials involved. If one has a process that emits gases (like chlorine for instance) which can produce acids or other hazards when mixed with moisture, then some materials corrode very quickly and fault soon after requiring expensive replacements. Most manufacturers have chosen to provide a variety of materials for the case design—from alloys of aluminum to alloys of steel—and have incorporated materials solely from a design convenience perspective not from the user-selection perspective. The present invention is preferably designed with only 2 materials for all nodes—this enables a selection based on a small amount of decision making. If a user's process is OK with glass and 316L stainless steel, then the user can go ahead and order. Most processes are ok with that combination. Most manufacturers can provide these but usually at significant extra cost.

An aspect of the present invention is to have as few materials involved in the case design as is practicable—such as only one or two. Presently the inventors prefer glass and SS316L. This means that a user doesn't face a multitude of choices and time-wasting—they simply are told that the embodiment uses glass and 316L—and that typically works for 99.9% of cases.

Summary—an advantage of the present invention is to stop saving pennies on case materials if that only meant a serious delay/dilemma for the purchaser—the advantage is speed/EOU++ and simplicity.

Having No-Buttons Prevents Issues Around Hiding/Access/Finding/Reaching—No Need to Site Unit in Accessible Places to Humans at all, or with a Particular Orientation.

Besides preventing the need for a pass-through of some type (see above) on the case, the force sensor aspect of embodiments of the present invention, has no buttons at all and this is also an advantage, no matter how it's achieved, for a couple of reasons.

Having no buttons means the case design doesn't have to account for rotational alignment of instrument to its installation at all. Normally with a screen and buttons (the present invention preferably includes neither) one must align these to a user accessible orientation or direction for use (and one additionally can not align it to several directions if that is preferred—another disadvantage for the prior art and another advantage of the present invention). Eliminating the buttons and screen (removed to a remote HMI—see elsewhere), the present invention simplifies the installation significantly again. This is not to be underestimated in value—making things line up and be accessible is a major headache to non-trained staff in the installation steps.

The designs of the present invention preferably have rotational symmetry, meaning they have no concern for alignment, no concern for directions, and no concerns for access at all—and that last one is a bear if the unit is placed where the process is measured as it must be—rather than where a user can ideally (or practically) access it.

The last thing an installer wants is to get to the point of tightening the instrument into the process access hole (for example a pipe) only to see that the unit is tightened with the buttons and screen pointing off into an inaccessible direction. He/she backs it off a little to align it and suddenly the fitting leaks. This means they look for other solutions like unions, and tricks of rethreading. All this is messy and time consuming Summary—having rotational symmetry coupled with remoting the HMI and a force sensor button has removed major installation headaches.

Glass to stainless bonding—domed XP ss/glass housing configuration Preferred designs of the present invention use a glass dome for the housing on a SS316L base. This dome allows both for visual indicators (leds) and for radio antenna transparency (for Bluetooth, for example).

Although the present inventors know of other devices using glass domed housings (e.g. luminary fixtures), the present inventors have not seen such designs in the instrument space. It is believe that to use glass and SS316L in the manner described herein with the sealing mechanism described herein is unique. The sealing mechanism passes the stringent hazardous area testing regimes (like ATEX or FM testing) while maintaining the impact resistance, gas pressure hold-back (hundreds of psi), and still has relatively easy assembly and low cost.

The unique design of the present invention's glass-to-steel seal complies with XP regulations including thickness requirements and length of flame path requirements, while providing for ease of production with inspectable results.

The glass and steel can be bonded together in any suitable manner (such as with cement, two-part epoxy, or otherwise) to produce a "cemented joint" in the domain of explosion proof/flameproof design.

Installation

Join Process/Association

The present inventors studied the problem of wireless device association for some time before inventing the present solution. The problem in the prior art is that wireless devices are typically shipped individually and not yet associated to one partner device (the master/slave relationship). This is because they might be made at different times, installed separately and even have to join a master with a number of other slaves already associated to it.

The association is typically achieved via a pressing of a button on the two items to be associated and using physical proximity to avoid mis-association to another master further away. Radio range isolates the pair in space, and the buttons fix them together in time. One needs the intended pair to become sensitive to each other's requests when they are desired to associate, and to not be sensitive when it's done/over and not intended to be redone.

Also any radio association process should give the user some feedback that it worked. In many cases this is ignored or minimized as the devices simply don't have indicators to use to express a good or bad association. Bluetooth headset-to-phone associations are a typical example. In instrumentation field installation, having a clear and unmistakable visual metaphor of the join process is a unique solution to the problem.

To succeed at being EOU++ a metaphor should express in natural and "zero training" ways (EOU++) a number of considerations regarding this process. For example, it should express the process has started both at a slave, and at a master, that it is over (timed out), or ongoing (in process), that it is successful, or has failed and even that it is not possible (the master has too many slaves already).

The system of the present invention preferably has one central controller (CC) and several (for example, up to 8) end nodes (ENs) which read process variables via their sensors—the combination is called an IAN (instrument area network).

The IAN nodes (CC or ENs) of the present invention preferably use a force sensor button to initiate an association—this can preferably be done on the nearest convenient node—not necessarily the central controller (CC). So preferably any EN (or the CC itself) in the present IAN can awake the CC to be receptive to a new EN attempting an association.

Once awake the CC and all presently associated ENs preferably flash in synchronism to show that the IAN is awakened, and is ready for a new EN to "join" them via an association step, and they visually indicate this via for example a bright daylight-readable LED flashing. This is preferably the first part of a visual metaphor for the entire IAN being ready. Preferably, each node i.e. all present members flash together with the CC in unison.

Once this occurs the user presses the force sensor of the new node (EN) which he intends to join to this IAN group. Then this new EN preferably also flashes but out of synchronism to the IAN (which are preferably still in sync with each other). The visual metaphor is of a separate new EN also wanting to associate.

Next the system preferably does the association in SW (software) and passes to making the new EN flash in sync with the entire IAN—which then flashes as a new extended whole. This completes the visual metaphor of "joining" and it does so in a natural and "zero training" fashion.

There are similar metaphors for leaving a group (an EN disassociates from an IAN it belongs to); for a failure to join when it was intended to do so; for a group too full to accept another EN (even if all else were ok) etc. These are detailed elsewhere.

One does not have to be Up Close to the Unit One is Installing to Configure it.

Having the ability to configure a unit without touching it is a new and possibly game-changing idea. Often these units are installed in hazardous areas, where it might be too hot/too cold, have poisonous gases present, or a high risk of fire. Just have a person being there might require the plant to shut down processes to ensure safety—and that means loss of production.

In the prior art, whenever similar instruments were designed, the assumption is that a user can access them at any time needed to configure them, and so the designers have placed buttons and displays integral to these instruments themselves to do exactly that.

A major breakthrough of the present invention is to recognize that the buttons and displays advantageously belong elsewhere—closer to the user, possibly on a handheld unit or tablet—not on the instrument which is placed for process reasons and not HMI reasons. This results in easier installation—no need to lean over gantries or across hot pipes to press tiny buttons (because they had to fit smaller and smaller units) and to try to see tiny displays (same reasons); and no reason to get permission to turn off hazardous processes or affect production either.

Removing the buttons and displays from the unit being installed and instead placing them onto a tablet-like device, cures many ills of that poor design process. The buttons aren't constrained to physical ones (usually undersized to minimize costs, space etc.) but can be as big as needed, flexibly instantiated on the touch surface of a phone or tablet computer, and can dynamically reconfigure to new needs as one goes through a process. The same with the display, the constraints of small size, low cost, fixed functionality and low power (poor visibility in darkness for instance) are all now gone.

Additionally due to other design features, access to the unit is not required much at all except once at installation, not continuously as in the case of older designs were one had to configure it or reconfigure it "in person". So for the instruments of the present invention, access is not required across hazardous areas, nor in darkness or blazing sunlight, both of which make reading small displays nearly impossible.

EOU++ is greatly increased in the normal use of the unit by this separation of buttons/display (HMI) from the instruments' necessary placement in the process area (pipework typically). Additionally the cost of the instrument is lowered—and its ruggedness increased—and the HMI can be properly carried in and out again from the hazardous area to maintain its integrity (not being exposed to UV (some displays dislike this) and not getting scratched or being hit by junk, etc.).

Location and Archive Additions photo/video/tagging/gps
Usable Squawk function—omni visible
data tagging/user signature on all configuration changes
logging of "everything" all changes by who/when Minimizing impact to existing installed WLAN (e.g. Wireless HART areas)

"hiding complexity" several nodes behind one node minimizing disruption to existing network/stability/plant disruption minimized wireless feedback controller and IAN specific advantages PID latency issues like bring back data, process, and send out new values—IAN preferably has control of variable timing and can optimize that time for control loop/energy consumption on battery The present invention preferably includes a network protocol converter which bridges two distinct network time bases. This preferably supports all traditional control loop algorithms, which typically require guaranteed periodic samples intervals.

The present invention preferably includes virtual instruments (e.g. similar to those commercially available from Totalflow company). Preferably, with the present invention one can (inside the IAN) perform a multiple sensor read/combination from non-co-located sensors (but relatively close).

Preferably a local instrument network can gather upstream network variables to compute control/or be part of a virtual instrument.

Another embodiment of the present invention includes improvements to One Time Pad (OTP) encryption allowing users to send and receive truly confidential messages (see FIGS. 19-36)—"best" cryptography Process reads, or control updates, each individually hashed with settings and then signed through a cryptographically strong process, can be used with the present invention.

Using OTP encryption affords the unique possibility of perfect secrecy for the relaying of data from a sensor node to an end point. Once thought prohibitive in the amounts of data required and that the transport network (e.g. WirelessHART) could not support transparency for proprietary encryption (as these networks often use their own encryption, albeit a PM infrastructure with its attendant weaknesses).

Sensors are used to measure physical parameters, then derive indications or calculated values and relay those indications to either more infrastructure (computers and storage for example) or to humans for reading and interpretation. The relaying of this data is often done over wired or wireless networks from the sensor to an end point.

When data is relayed in this manner it is vulnerable to being intercepted and read by non-authorized users (human or machines) that can read the data and make nefarious use of it. This use could be as simple as unauthorized copying, to full interpretation and use for monetary or other gain.

The traditional methods of preventing this range from having the networks (for instance wired networks) entirely within the boundaries of property control of the owner, to prevent untoward interception, to the use of encryption on the data (particularly in the case of wireless networking where signals easily leak across property boundaries).

Such encryption methods are many and varied, each with strengths and weaknesses. Typical systems in use might be AES, or DES using asymmetrical key encryption (public and private keys)—these are near state of the art systems that protect the data based upon an assumption of the difficulty in determining the asymmetrical "twin" of the publically disclosed key.

Such asymmetrical schemes are based upon the difficulty of certain mathematical functions—such as factorization of large composite numbers into primes (with numbers as large as 2048 bits or more) or the inverse logarithm to some base or the difficulty of mathematical systems for factoring (like elliptical curve systems).

In all cases the presumption of difficulty has been known to be vulnerable to increases either in mechanical performance of computing power ("Moore's law" type concerns) or to improvements in the mathematical state of the art (in factoring algorithms for instance). These vulnerabilities can never be completely eliminated and historically the rapid and unpredictable pace of improvements (in both fields) has often left even experts dumfounded. Reliance upon these methods is always a bet upon the future's inability to do something . . . such bets have historically always lost.

However there is one method and a well-known one for protecting data by encryption that is uniquely capable of being secret and remaining effective so indefinitely. That technique is generally known by "One Time Pad" encryption or OTP.

OTP systems have been known for some time but have been considered impractical by experts in this field due to many concerns. The present invention over comes these concerns and renders OTP viable as a means of protecting sensor data in particular.

OTP is then a known "perfect" secrecy mechanism if the three tenants are maintained.

1) That the key pad consists of truly random data and is not therefore predictable in any manner
2) That the key pads (two copies—one for transmittal and the other reception) are kept secure from being copied (physically secure)
3) That the pad data once used is destroyed and never reused.

However embodiment in real sensors has been considered impractical by even experts in the field due not directly to the nature of these three tenants but primarily to the considerable pad size and the burden upon implementation it presents.

Another impediment is that the existing systems of wireless sensor networks (and most sensor communications in general) have means to do all kinds of data manipulations but do not have a simple means of relaying data end to end transparently.

This is an underlining need when we want to make OTP work, since the encrypted data is now "meaningless" to the system of transmission as the data within that transmission has effectively become obscured—for example a temperature reading from a sensor no longer looks sensible (in the expect range and changing relatively slowly) but instead upon encryption would look to be swinging widely about and varying in non-physically realizable ways. A temperature can hardly appear to move hundreds of degrees C. in one direction and then hundreds more in the opposite within a second or two when it is supposed to represent some physical object's temperature and that object has thermal mass of any significance. So encryption can confuse the subsequent systems unless it is decrypted first.

This invention is a means of economically overcoming the burdens and implementing OTP in sensor networks.

Hurdle One—the Pad Size

If one considers that every bit of the messages sent through any OTP scheme must have a corresponding bit of OTP pad key data, this is usually the most significant hurdle to implementation. For instance, WI-FI networks (802.11b) running on 2.4 GHz ISM would send data as fast as 11 Mb/s—but could send as fast as (802.11ac) 1 Gb/s (or indeed 10 times that in some lesser well known systems). So to have a pad capable of sending data for an appreciable amount of time (say 5 or 10 years) and to do so without further renewal of the pad (which is a burden too), the OTP pad size would to hold 60*60*24*365.25*10=315,576,000.00 seconds worth of entries. Each second the network sends as much as 116 data bits (802.11b) to as high as 109 data bits.

So the total bit size of the pad for Wi-Fi (even just 11b) is around 4.34*10**14 Bytes or around one hundred thousand gigabytes (using a true 2^32 gigabyte definition) of data. In the case of the faster standards that could be as high as nine million gigabytes or more.

Today's storage in FLASH memory is prodigious and getting better and better—but the prospect of even a single thousand gigabyte chip is still years away (256 Gigabyte being the state of the art at present), let alone a hundred times that or indeed nearly 10 million times that size being needed for the higher speed cases.

These two simple facts have hindered the implementation of OTP—firstly the impression that we couldn't possibly have enough storage of the required size economically placed within a sensor, and secondly that any appreciable speed of networking running for 10 years (a reasonable design goal) requires storage on unobtainable size (if a single chip is considered).

However the present invention allows these two facts to act NOT as constraints in sensor networks—as these in general are much slower speeds (a few megabits per second) and actually use as little as a single message per second (of a few dozen bytes) and that therefore they can use OTP to protect their data using a reasonable OTP pad size for the entire life of the sensor in the field.

For a sensor sending data of 64 bytes every second over 10 years the OTP pad size is merely 4.7 Gigabytes of data—which is well within the available chip sizes of today (2 to 128 Gigabytes).

It is the combination of the relatively low accumulative throughput (despite the long life) of a sensor's traffic AND the available size of economically available chips (around $20 or so) that makes OTP economically possible in a small sensor (typically costing around $100-$500 to make).

Hurdle Two—Economics

Related to hurdle one—it was thought that since the OTP data pad was "enormous" it was also uneconomic on its face to use it in a low cost sensor. Sensors costing around $100 to make could not use large storage of approximately 1000 Gigabytes. The present invention as used on industrial sensors (that have limited battery power and so transmit rarely to conserve it) allows for actual data storage for the actual OTP size needed. Present day FLASH memory of the required 4 Gbyte size or so (10 years once per second transmit of 64 bytes—around 16 time the expected amount) cost $20 or less representing an economic feasibility.

Hurdle Three—the Lack of Transparency of Data on Existing WSN (Wireless Sensor Networks)

This hurdle often exists on any communication means currently sending sensor data to a remote point regardless of wired or wireless.

The transportation of sensor data to an end point is but one function of the communications link between end point and sensor there are many others. The primary purpose is the transmission of the data value (the so called PV or primary value) and this, along function with all these other functions (e.g. range setting) are embodied as a set commands in a protocol, result in rigid and limited field of possible functions (to enable their encoding as "types"). Such encoding has rarely if ever allowed for transparent data sends end-to-end.

Previously, this has meant that the ability to send encrypted values did not exist (outside of the native mechanism) as the number of functions is fixed and limited. However the present invention allows users to encrypt data IN-PLACE over the area meant for the unencrypted PV is a new invention. Preferably, encrypted OTP PV values are moved end to end without asking any new functionality of the existing communication means.

Preferably, this in turn means allows the present invention to intercept and decode the encryption before any further use is made of the encrypted PV (where the user assumes it's in the clear) as using it encrypted would represent widely outlandish physical properties and values as the encryption is certainly not a smoothly changing physical PV value.

Hurdle Four—Configuration/Commissioning and Use

Another and possible the greatest, impediment to using encryption in Sensors, arises from the sheer number of processes involved in setting it up. In the case of OTP encryption the installation of the pad in the end points of the communications link is often a time consuming and "painstakingly" detailed procedure.

When considering placing sensors quickly, in the field (possibly hostile conditions) and with minimal training costs (new processes et al.) considerations like where do I load the OTP pad (from a memory stick of some kind, or what) on the sensor and on a different device (the end point), become so burdensome that the ideas often ever become a commercially viable design.

Summary of Improved OTP Encryption:

The embodiment of the invention (preferred) consists of using OTP in sensors that report over communications links (BLE for example) that are wired or wireless, and that may or may not already have their own security/encryption. The invention is to preposition the OTP in both the sensor (at manufacture) and the end point (at manufacture) such that once in the field the entire OTP encryption works without any setup or configuration from the user/installer.

This is in stark contrast to the standardized encryption of communications such as BLE (Bluetooth low energy) whereby keys and other measures are added (WirelessHART network join keys for instance) by a user/installer using either a handheld device (like a laptop or programmer) and connected to the sensor (firstly) then the end point (secondly) or possibly in the reverse ordering, to program in to these devices enough data to provide encryption. If this data is small (a few dozen bytes—using hexadecimal encoding for example) the task is still substantive as the user/installer must open the devices, set up a configuration on buttons and using displays (HMI) to get to the right areas of the configuration data, and then make changes. This can involve great care to enter the keys accurately, time to open and reclose enclosures, book keeping of the keys used, and maintaining privacy/secrecy on the values in use (even as they are multiply entered).

If the data to be entered is more than a few dozen bytes—then its likely entered programmatically—which whilst avoiding data entry errors opens the door for unauthorized copying simply because there is a copy there to steal. Also if OTP were the encryption with its attendant high volume of data, then manual entry is impossibly impracticable, and programmatic entry fraught with concerns over spreading the secrets in too many locations on too many devices.

Instead the invention prepositions the OTP pads in both ends of the communications link, and then and ALWAYS uses the OTP for all PV value transmissions from day one, WITHOUT any user input, commissioning step or programming steps. By staging the OTP within the sensor and end point, from manufacture (as a mated pair of pads) the two devices start using OTP (with well-known methods to sync' of their indices) from the start.

This approach is extremely valuable—gone are the needs for record keeping and their possible compromise by criminal/nefarious elements—gone is the step up by entry of possibly gigabytes of data. Instead the sensor and end point have enough OTP key data to supply the entire functional lifetime of the sensor without ANY involvement from the user/installer.

This in turn eliminates many concerns as the OTP can be fixed to the devices (not removable—avoiding another common source of copying—remove, copy, replace)—is always matched—is destroyed in place (after elements are used they are destroyed) and lasts the life of the product. Requiring NO maintenance.

See for example, FIG. 38-41, wherein there are preferably just two major components: the sensor device (1501) and the end point device (1503) connected by a communications link (1502).

Figure 39:
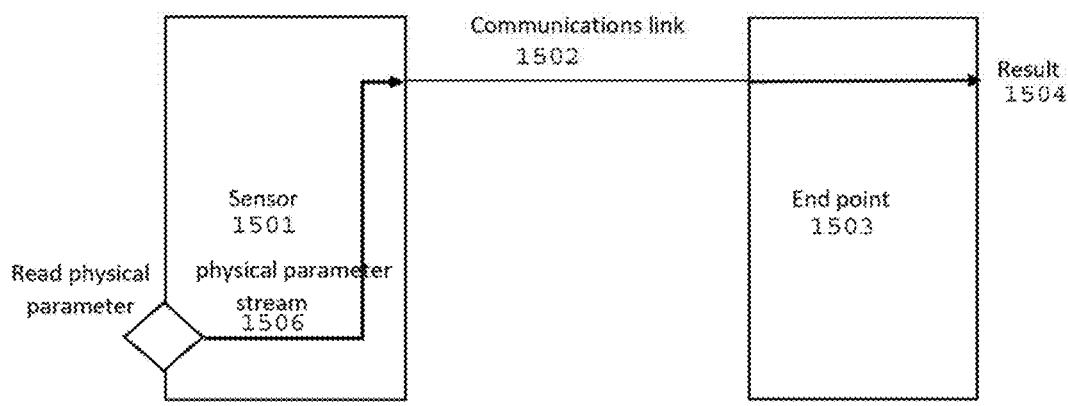
FIG. 39 shows components used in regular sending of PV with no encryption.
Figure 40:
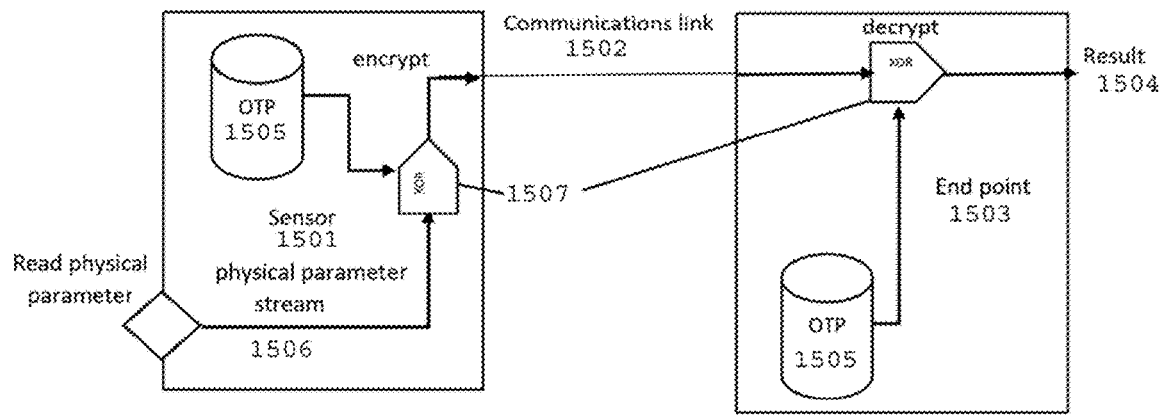
FIG. 40 shows the components used in encrypted sending of PV for a preferred embodiment of the improved one time pad encryption of the present invention; and, FIG. 41 shows a normal design installation of the OTP stores for a preferred embodiment of the improved one time pad encryption of the present invention.
Figure 41:
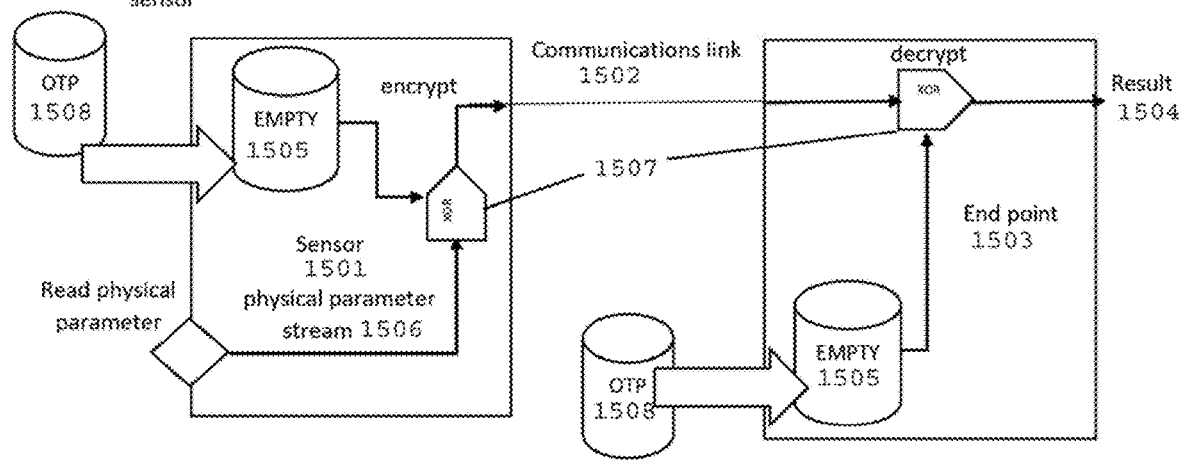

Inside the sensor device 1501, there is preferably no processing at all (see FIG. 39). Instead, preferably there is a means to encrypt the PV value in-place (see FIG. 40) and a corresponding decryption element in the end point (1503)—the encryption and decryption use identical OTP pad stress (1505), preferably holding enough OTP keys for the lifetime transmission of the sensor values over the communications link (1502).

Example 1—Data Flow of Encryption

The encryption of the sensor readings (FIG. 40) preferably occurs by the well-known technique of exclusive OR function (XOR 1507) on the data as a serial stream of bits (1506) and the key stream read from the OTP (1505) store.

Decryption is preferably the reverse process. The incoming data communication is preferably decoded for the position of the PV value (presumed in this example, to be known by the rest of the system in place to be in the clear) and its XOR'd with the identical OTP entry in the local copy of the OTP store (1505).

Notice the actual form of communication means is irrelevant in this example; it does not matter for this invention if that is a synchronous/asynchronous or packet based system or whatever. At some point the receiving end node preferably understands the PV value is present and can extract it for passage to the XOR (1507) device (along with OTP data 1505) for decryption.

Differences from Normal OTP Designs

The invention preferably:
1) has the OTP stores (1505) in place, preferably permanently affixed from manufacture.
2) does not require that the OTP be programmed in (FIG. 41) from external stores (1508)—nor that it be keyed—nor that it be refreshed or renewed during the useful lifetime of the product.
3) preferably does not have external representations (1508) of the OTP vulnerable to being copied (one of the effective means to subvert OTP is copying the pad) and so has removed many vulnerabilities stemming from these copies existing in the first place (the 1508)
4) preferably does not have different stores of OTP loaded into the two ends of the link. This is a time consuming and difficult issue where the two ends are remote from each other—and requires both bookkeeping and due to the delay in time, extra physical precautions on copying.
5) operates using the OTP scheme from message one forward (preferably not in the clear) and preferably avoids having to wait for the two ends to be configured before use (another logistics problem)
6) replaces decrypted PV restored into the same position (logically and physically) as the previous system would have treated unencrypted PVs and so is transparent to the subsequent systems downstream of the end point (hanging off Result stream 1504)

In the case of a BLE link for example, this means that whether the user sets up BLE security well, or at all, is irrelevant; and, the encryption is preferably always intact and preferably always has perfect forward secrecy.

The present invention preferably makes use of Separate & Distinct Wireless Displays:

As mentioned elsewhere, an advantageous feature of the present invention includes sensors which are more robust than prior art sensors since they preferably have no displays on the sensors themselves. Rather, via a wireless interface (such as Bluetooth) a remote display communicates with the sensors and allows control of the sensors.

Displaying Upstream Network variables, within local instrument network display

The present invention preferably has Handheld/Walk up capability:

Battery pack, exterior to instruments housing, rugged quick release mechanism, no downtime to instrument do to secondary internal power supply In a preferred aspect of the present invention, a clever system of dual long-life batteries is used to minimize downtime to replace batteries. Preferably, a battery with a long shelf life (for example 20 years) and a long useful life (for example 5 years in continuous use in the sensor) is sealed inside the sensor in an explosion-proof manner (all sensors of the present invention are preferably intrinsically safe for use in volatile environments). A second similar battery is removably attached to the outside of the sensor in an explosion-proof manner. The sensor is preferably programmed to use power from the second battery first. Preferably, when the second battery expires or reaches a very low power level, the sensor sends a signal to the control unit that the second battery needs to be replaced. If the second battery expires before it is replaced, then the first battery will preferably automatically take over the power function of the sensor. Once the second battery is replaced, the sensor preferably draws power from the new second battery and the first battery becomes a backup battery again. One can see how using this system the internal battery can last a very long time as it is only periodically used while the sensor is waiting for the second battery to be changed. Even if a user takes a year to replace the second battery each time it expires, the internal battery could still last for its full shelf life (for example 20 years) even if the second battery needs to be replaced four times.

Various embodiments of components of the systems, apparatus, and methods of the present invention follow.

Data Tagging

Preferred embodiments of the present invention generally (but not in a limiting way) relate to the field of instrumentation, process control and computing. A particular embodiment relates to reading process values across a network (wired or wireless) within a plant.

Background

Instruments have been developed that measure particular process variables like temperature or pressure, from some process point (for example on a boiler pressure vessel) and have their values presented as fully calibrated human readable numbers in appropriately chosen units (like degrees C. or PSI etc.) These values are sometimes used at the point of measurement (e.g. a dial showing pressure on a boiler) and sometimes at remote locations (e.g. an operator display in a control room, or in a computer control loop).

When relayed to a remote location, the instrument sends value as a minimum length data expression—to save time, energy of transmission, and for historical reasons (brevity being the norm). The value (whether that is a human readable value or some intermediate stage) calculated and sent has an implicit state which is NOT sent. That "state" is the particulars of the calculation used to construct the value from the raw reading (raw here being typically the result of an analogue to digital conversion process). Such state might include the offset, gain, type of engineering units and other parameters previously loaded (by command or by assumption/default) into the instrument during its calibration and commissioning.

This state changes from time to time as new calibrations are made, new parameters are loaded, and other maintenance or programming changes are made in the plant. The typical plant is operated by a diverse staff of several groups of people of different responsibilities and skills. Sometimes state is changed by one constituent and that change is NOT communicated to other constituencies who are essentially stake holders in the validity of information gathered and relayed from that instrument measurement.

This gives rise to a serious issue. If these operational parameters are changed and one party is not aware of the change, a misunderstanding of the new readings from the instrument can result and cause considerable harm—including anything from financial loss to actual bodily harm or even the death of plant personnel. So serious can a change of this type be, that some plants institute strict controls on when, who and how ANY changes can be made to instruments. Nonetheless and especially early in the process development changes typically are made for configuration, compatibility, ease of use, and consistency. Making these changes is often fraught with error and problems. For an example of how even very professionally run organizations are impacted by these types of problems consider the space probe that failed to land on Mars as a result of a units mismatch, where mph was used for kmph. This is an example of units confusion in a reading of velocity being used by different constituencies and resulting in a massive loss ($125Million, and many years of effort).

So understanding the entire contributing environment around an instrument reading which was used to construct that reading is highly desirable, but has been considered not possible until now. A single reading might involve the use of dozens of parameters used as an environment to frame the calculation even as that results in a mere 32 bit value being produced in the end. Sending the full environment could need hundreds of bits of information (typically ten times the value itself) to specify it fully. For example, a gain plus an offset value plus units specification might take over 1000 bits to express.

So simply packaging the environment used to calculate the value along with the value itself, when such is read, would burden communications systems by factors of 5 to 30 or more, meaning communications interconnections would have to send many times more data (typically rarely changing data BUT vitally unchanged without agreement) along with the data itself to fully have the receiver verify the environment that calculated the value for transmission is exactly the environment the receiver expects the value to have been calculated in. If it's not so then the receiver has the wrong assumptions and at the very least a wrong value might have been assumed correct.

By way of example, something as simple as an operator changing units from psi to bar on an instrument that develops a pressure reading BUT not on the DCS (data control system) that receives it could result in an explosion in a plant when a boiler is driven to the wrong set point of pressure.

Having the environment carried WITH the reading in an economic manner (typically this embodiment is at worst a ×2 data volume increase) would be an extremely valuable indicator that both ends of the process (instrument and DCS) concur on the environment, and therefore on the method of calculation used, and therefore on the validity of the read itself In the present invention, the additional environmental data is preferably named as an "environmental tag" or just "tag."

DRAWING DESCRIPTIONS

FIG. 1 represents the overall picture of operation as might be used in an industrial measurement setting.

101—is an example of a vessel in a plant which is being measured for a process variable (here it might be pressure)

102—is an industrial instrument capable of reading that vessel's (101) internal pressure and relaying it by some means (103) (radio, wires etc.) to a point of use 104

103—is the means of transmission of the process instruments' value to a remote usage location (104)

104—is the computer or DCS or other system (even just a display) where the previously read process variable (pressure of 101) is being used to good effect.

105—is the calibration, setup, configuration and other data that the controlling computer (or indeed the manufacturer at build time) sends to the instrument to configure the measurement—it resides in the database 302 and is sent to the database 202. Databases 202 and 302 are separate and distinct, they are in different electronics at different ends of the network (103). However they contain the same data. One set of the data is stored and used in the sensor (for calculation of the "process value" by modification using those values, of the "raw" data) and that is the copy in database 202. The other AND PRESUMED IDENTICAL values are in database 302 at the receiving (other) end of the sensor network (103) from the sensor. The present invention preferably actually checks that presumption and so prevents mistakes in the two versions from tripping up the users and adversely affecting the results of the reading the sensor.

Figure 2:
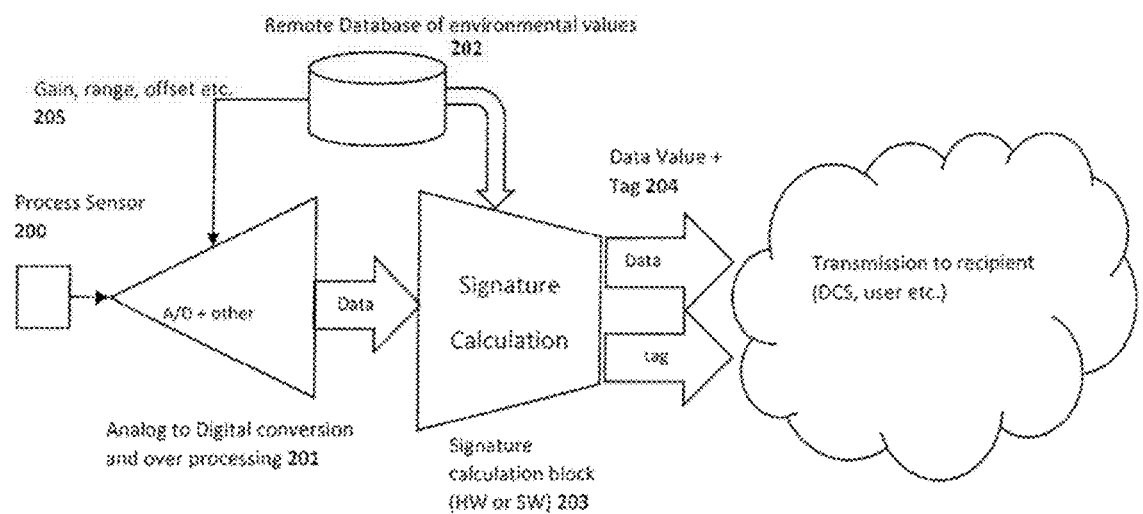
FIG. 2 shows the elements associated with a preferred embodiment of the present invention contained within the transmitting device 102 as used in an industrial setting.

FIG. 2 contains the elements associated with the invention contained within the transmitting device (102)—for example an industrial instrument.

200—is the sensor element—this might be a piezoelectric device attached to a boiler to measure pressure for instance.

201—is typically an analogue to digital conversion device (typically an IC) which "reads" a voltage or current associated with the output of the sensor (200) and makes that into a data value for further processing. It makes this conversion based on an environment of controlling parameters (205) provided from a database (202) of such parameters stored in the instrument.

202—is the database of stored environment parameters critically used in production of the data from raw sensor input (200)—all these parameters potentially affect the validity of the data conversion.

203—is a block of hardware or software to calculate the tag which will accompany the data to the receiver. Each and every bit of the parameters in the database (202) must influence the tag's final value so that any change to the same results in a different tag value. There are plenty of "hashing" algorithms in the prior art to provide this functionality (SHA1 [Secure Hashtag Algorithm 1] being one commonly used version)

204—the data and associated tag are kept as a duplet and rendered to the transmission side of the instrument where they are transported to a receiver.

Figure 3:
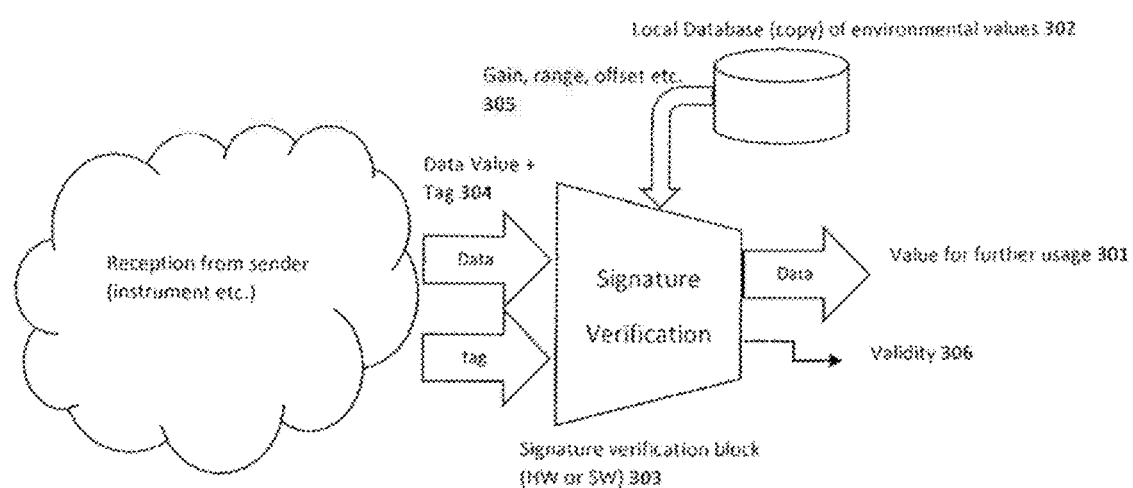
FIG. 3 shows the elements associated with a preferred embodiment og the present invention contained within the receiving device 104 as used, for example, in an industrial DCS or control computer.

FIG. 3 contains the elements associated with the invention contained within the receiving device (104)—for example an industrial DCS or control computer. In reverse numerical but data flow order . . .

304—The duplet containing the data and associated tag are received and forwarded to a processing element (hardware or software) (303) for validity checking.

303—is the signature verification block. This block reads the data and tag (304) along with parameters (305) from a local database (302), of the environment presumed to be used by (102) in the production of the data and tag as in apparatus of FIG. 2

302—is the local database of parameters which will be used to verify the data and tag 301—the final data is forwarded to more processing or display elements accompanied with a VALIDITY flag (306) which confirms or alerts the next user section to the data's consistency of production (FIG. 2) compared to its consumption (FIG. 3).

DETAILED DESCRIPTION

This embodiment describes the addition of a minimum of extra data (the tag) attached to a process read forming a duplet which has been calculated in a remote instrument (102), so that the DCS (104) making such a read from said instrument, can validate the entire environment of the calculation is exactly as expected. Calculating a tag at BOTH ends of the communications link verifies the data read value is both correct and correctly calculated.

The data used to configure the device is sourced from the database in the DCS (or similar system) (here 302) however the copy in the instrument (202) does NOT necessarily track exactly the copy presumed to be right in the DCS (302). The database of configuration and environment that affects the data calculation in the instrument (dBase 202) can be changed locally by an operator without mirror changes being made in (302). This is only one means of errors being made.

Note again that the environment changes (202+302) infrequently but when it does change it changes critically. Having an indicator of the myriad environmental contributors carried with the data itself, one which is not excessive in bandwidth or energy use (for instance in a battery powered radio system where energy is vital to lifetime) is a unique and extremely valuable capability. The embodiment efficiently uses both computer resources (it can recalculate them as needed or even store these environmental indicators as static tags to send as needed) and energy resources to make these environmental tags.

A tag can be calculated in several ways—but important among these are ways that both compress the environment to a smaller representational tag, and which ensure the tag is different even for minimal (down to 1 bit) changes in the environment. This property is needed in other communications fields like CRCs and Error checking in correcting codes (ECC). However here the use is NOT to correct a value being in error from communicational faults, rather it's to inform the recipient of the entire process environment used in make the calculation of the value itself. Other means in the communications channel can (and typically does) protect the value itself (even correcting communications errors if needed).

The embodiment uses a kind of data "signature" to encode the entire environment in a tag. This is done by passing each contributing factor of the environment through the signature block sequentially. This logic block (or program segment) calculates a relatively small length data word from the elements sequentially presented to it. There is plenty of prior art on how exactly this combining may be done (see Hamming codes, CRC—Cyclic Redundancy Checks etc.) and the means is not vital to this invention. What is vital is that the resulting tag be sensitive (meaning it changes value) to a single bit change in any and all of the defining environment contributions. Since the mathematics of this combining is well understood such a code can be found for all sizes of environment and to some degree of efficiency. What is important is that the chosen algorithm cover changes both of small and large extent in the environment by having the tag be different as a result. Inevitably there must (mathematically) be combinations of environment that although widely different map to the same tag value. The importance of selecting the algorithm with care is to ensure that this is a remote and unlikely occurrence from the set of expected environmental "misunderstandings". Such misunderstandings would be sets of more likely patterns and less likely patterns—covering the most likely is the important decider. The signature generation is a many-to-one function, but one that is well "spread" meaning changes in the many that might be expected to occur are reflected in changes in the one. When chosen correctly only enormously unlikely changes in the many result in no changes in the one.

Other Inventions (Derivatives)

This invention can be extended to include other specific data as separate items in the "environmental tag". For instance:
1) Device Serial number
2) Device Revision
3) The DATE and time—this is important to confirm several things, that the clocks are working, that data is not stale, and that changes to system clocks are in sync.
   a. Sometimes the time being part of a compressed tag is not viable as the two different ends of the link cannot confirm what exactly the time used for the tag signature should be. (the communication could be of variable delay) in this case the tag can become a triplet of data, tag (for the environment) and time (explicitly)
b. Alternatively the controlling end of the communications could have provisioned the instrument to read at a particular (coordinated) time, because the two are synchronized to some degree, then the tag could have the time (or a simpler sequence #) mixed into the tag signature for verification. Missing samples become obvious from non-sequential sequence numbers.
4) Operator ID—this could be the ID of the last person to change the environment—enabling an audit trail for authorized/non-authorized changes etc.

Digital Signature Reads

Field

Embodiments of the invention generally (but not in a limiting way) relate to the field of instrumentation, process control and computing. A particular embodiment relates to reading process values across a network (wired or wireless) within a plant.

Background https://en.wikipedia.org/wiki/Digital_signature

Instruments have been developed that measure particular process variables like temperature or pressure, from some process point (for example on a boiler pressure vessel) and have their values presented as fully calibrated human readable numbers in appropriately chosen units (like degrees C. or PSI etc.). These values are sometimes used at the point of measurement (e.g. a dial showing pressure on a boiler) and sometimes at remote locations (e.g. an operator display in a control room, or in a computer control loop). Such readings are contained in messages digitally sent across communications infrastructure as needed.

When relayed to a remote location, the instrument preferably sends a value over a communications channel that may not be secure. This might involve radio links (where an attacker could eavesdrop and attempt to send fake readings or other attacks), or public infrastructure (the internet for instance) or other non-secure networks. This transmission over unsecured networks is one source of the need for readings from instruments to be protected in the manner of this invention.

Other needs for this invention, include the possibility that instruments are moved around and misconfigured, leaving some uncertainty as to their validity as properly configured instruments and which are fit for a purpose (like running a sensitive plant—picture a nuclear installation where assuming an instrument is validly installed when it's not might be disastrous). Also someone could purposefully install a doppelganger of a real instrument to fool the plant control into erroneous operation, for financial gain, or for mischief and mayhem of many types (e.g. political protest or for terrorism).

Knowing exactly that the actual instrument intended produced a value, processed it as expected and is indeed the very instrument thought to be doing these steps on the behalf of a control or monitoring authority, is a vital function—the need for which is growing every day.

Background of the Invention . . . Digitally Signed Readings

For some time now there have been systems that use digital signatures to "sign" documents and the like for the purposes of verifying the validity of the signer (their identity for example) and the validity of the contents (i.e. that its unchanged since being signed)—these same digital signature/cryptographic algorithms are here used in an entirely new way, as the means of protecting the read value message of an instrument in the plant, because these messages become digitally signed.

When the digital signature encloses some data, together they form a cohesive whole (a "self-consistent" entity) of [signed(data)] which can be confirmed when it arrives at the receiver prior to use as being, unchanged (since formation), sent by the expected instrument and validly made at some UTC time. Any attempt to fake this, or modify the message containing the data would require an attacker to know the keys used in the encryption of the digitally signed message. The encryption used in these schemes is often of a two part form, using keys—one publically known the other kept private. Such keys usually are established before critical communication takes place—here this could be at manufacture or commission of the instrument.

Using digital signing the system at the receiver can rely on the data it has received even in hostile cyber-attack vicinities. This means of protection is recognized in the industry as being extremely robust and this type of digital signing prevents man-in-the-middle hacking attacks that attempt to make "fake" messages (wrong data). Having a full cryptographic identity in the instrument (as if it were indeed a person) is a known preventative for many means of attack.

Simply encrypting the data as some networks do (Wireless HART uses end-to-end encryption) whether done with public/private key pairs or other means does not provide for authentication of the sender of the data. These encryption mechanisms are common but they only provide privacy of the data. If the data is recorded it can for instance be simply replayed later to fool such a system. If the messages containing data are recorded they can be replayed from many other devices at many other times to disrupt the control system. These schemes do not cover the critical part . . . they need to answer this question "was the sender of this message really who I thought it to be?"

Digitally signing the data message as the invention here relates to, can ensure that the message is fresh (by include the UTC time of day in the body) and that it originated from the sender and no one else. A replay attempt would fail as the UTC differs from expected later values (later than the recorded messages' time). And a send attempt from an interloper or doppelganger would fail as these cannot know the private key of the real instrument.

DRAWING DESCRIPTIONS

Figure 4:
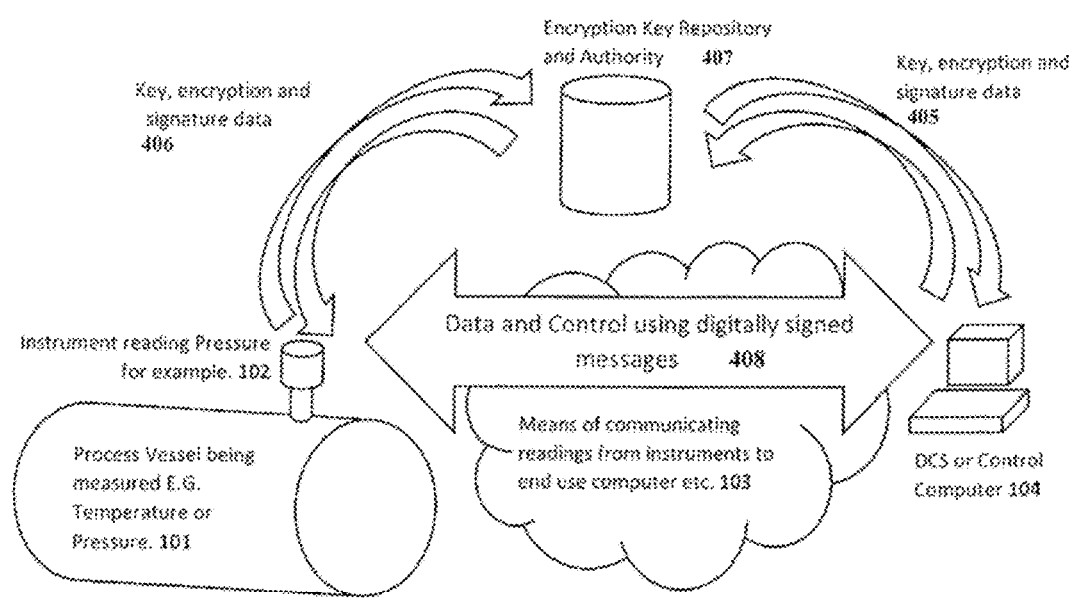
FIG. 4 shows an overall picture of operation of a preferred embodiment of the present inventions as used in an industrial measurement setting.

FIG. 4 represents the overall picture of operation as might be used in an industrial measurement setting.

401—is an example of a vessel in a plant which is being measured for a process variable (here it might be pressure)

402—is an industrial instrument capable of reading that vessel's (401) internal pressure and relaying it by some means (403) (radio, wires etc.) to a point of use 404

403—is the means of transmission of the process instruments' value to a remote usage location (404) which may have encryption of its own or not.

404—is the computer or DCS or other system (even just a display) where the previously read process variable (pressure of 401) is being used to good effect.

405—is the PUBLIC Key, encryption and other data that the controlling computer (or indeed the manufacturer at build time) places into the Key Authority (407) for use by ANY instrument to send signed and encrypted data to it.

406—is the PUBLIC Key, encryption and other data that the instrument (or indeed the manufacturer at build time) places into the Key Authority (407) for use by ANY DCS or Computer for them to send signed and encrypted data to it.

407—is a repository of PUBLIC keys that can be used by any system (instrument or computer or DCS etc.) ALONG with their own PRIVATE keys (placed into them at manufacture or during a commissioning step) to encrypt and sign a message intended for the recipient whose PUBLIC key was provided from this repository. These repositories can be private, public, or of any type suitable for the task.

DETAILED DESCRIPTION

Setup for Signing Messages

Before the system can relay digitally signed messages from one end to the other, there are a number of precursory steps.

Firstly the inventors will describe a PKI (public Key Infrastructure) approach. But Any viable key infrastructure could be used with its own steps.

1) The elements (instruments or computers) wishing to communicate in this way must first produce a number of keys. These are long numbers (often in binary form) that represent a pair of keys used to perform the signing. These keys are typically 128 or 256 bits long. They are generated as pairs (one called the PRIVATE key the other the PUBLIC key) and need to be carefully crafted—see prior art on such matters—having at least the property of being mostly "white" and random seeming (not long simple strings of zeroes for instance or ones, which would be low entropy patterns), and mathematically consisting of "one way trap door functions."

2) The PUBLIC key is placed on record in the repository so ANY and ALL users can inquire what particular element's PUBLIC key actually is (hence PUBLIC!). Note critically having the PUBLIC key gives NO clue as to what the corresponding PRIVATE key is, see the references on PKI.

3) The PRIVATE key is kept inside the element generating this pair and must be secret from all other elements in the communications environment. It's the secrecy of this KEY upon which depends the entire trust of the system.

4) Each element (again instrument or computer etc.) completes these steps if it is to generate or verify signatures on messages.

Using the Keys

Let's look first at some parts of PKI that you need to understand the operation. Firstly it's important to understand that both types of key public or private can encrypt data. Because of the nature of the key pair, only someone with the PRIVATE key can unencrypt a message which was encrypted with the corresponding PUBLIC key and critically vice versa is also true. Also having the PUBLIC key in no way enables someone to discern the PRIVATE key.

Once the setup steps above are completed—any element wishing to send another element a signed message, can proceed to do so.

One method of doing this is described—there are many.

Digitally signing is done by taking the message along with your own PRIVATE key to encrypt the message making stage1. Next take the intended recipient's PUBLIC key from the repository, and encrypting the result of the first encryption (stage1) using that PUBLIC key make stage 2. This constitutes a signing of the message. Stage 2 message is sent.

Sending this message to the other element occurs as normal. Decrypting the message is done as follows. First let's consider the intended receiver—he uses his own PRIVATE key to unencrypt the stage 2 message into a stage 1 message undoing the last encryption that was done (which was done using the recipient's PUBLIC key so his own PRIVATE key undoes this). Secondly he tries the PUBLIC key of the possible senders (a list he maintains) each in turn on the stage 1 message. He finds only the transmitter's PUBLIC key works (since the transmitter's PRIVATE key encrypted the message into stage 1). This undoes stage 1 and we have clear text. Notice the recipient can only be the intended one as only his private key undoes the sender's use of the recipient's public key. AND after trying all the possible PUBLIC keys of the possible senders the recipient knows that only one worked—that of the actual sender and so that sender MUST have encrypted the message into stage 1 as they only have the matching PRIVATE key.

But because PUBLIC keys are public, someone (anyone!) can attempt first to decrypt the message using the PUBLIC key of all possible elements or any other invented key they like (which is extremely unlikely to be "guessed" correctly). This will fail as they would have to use the intended recipient's PRIVATE key to do so. Only the intended recipient has that.

In this way the actual sender AND the intended recipient eventually do find WHO encrypted the message (as the public key layer of encryption is successfully stripped off). And that no other could have been involved.

This is ONLY one form of digital signature mechanism—other less elaborate ones work too.

Partitioning of Complexity for Wireless HART Networks

Field

In industrial wireless networks (such as Wireless HART) and indeed in many wired ones, adding and removing end points or nodes is supposed to be easy and non-disruptive to the functionality of the network of sensors and devices as a whole.

In reality the removal or add of a node that is involved in routing of data through such a network has a "knock on" disruptive affect to the network as a whole. This is often because the network has examined all the routes (pathways) existent to the physical placement and connectivity of the nodes, to determine the optimum pathways to actually use. Some of the pathways thus become major interconnection sections and others minor ones. Some are never actively used and might be reserved for backup or redundancy (as their "cost" is higher than the others).

To determine the ones to use and the ones to ignore, an algorithm (either distributed or localized to a controller in the network) must examine which paths exist (in a directed graph-like data structure) and determine which are optimal (lowest cost) and which are not, by assigning ALL links some cost value. Cost is often a measure of performance (speed, latency) or availability or even actual dollars/cents cost—or indeed a blend of many such parameters.

Once these costs are known their accumulative affects are used to determine the "right" paths through a network for data to travel along in some "optimal" way. Such decisions are not central to the present invention. Any system that operates with multiple pathways, and has preferred and/or backup pathways, has determined all this over time and at some cost in compute power. It might be dynamically re-determined (for active changes in the network) or statically upheld depending on architecture.

In any event it is costly and time consuming to make changes to these pathways. If changes occur more frequently than the design of the controlling algorithm is expecting then instability can occur. Basically the network must find new routes (optimized) and communicate them to the nodes (while the system is running is the preferred method), and do so quickly enough to preempt the next changes from cascading into the work on the last changes. If this work is not completed before more changes occur the network is inherently unstable AND it is using resources to do nothing but figure out its next stable state.

The resources used up include time and energy (battery-powered systems are particularly sensitive to energy) of the network as a whole, and these are being expended on NONE workload items—the topology of optimal routes is not the function of the network, the networks primary function is moving data from end nodes to other end nodes efficiently. This work of re-determining pathways is overhead, and extremely wasteful if done too often or too long.

Wireless HART is one example of an industrial network that uses a mesh wireless connectivity to provide redundant and resilient pathways. It does so by monitoring all possible pathways in some semi-continuous ways, and adapting as those pathways change. This monitoring and change control takes place in the broad outline as above, meaning it is costly in power and time.

Background

Problem: when devices are added or removed from networks like wireless HART those networks:—
 a) can become unstable for extended periods of time;
 b) can use excessive stored energy in reconfiguring themselves;
 c) can exhibit undesired behavior as they "hunt" for a solution to the new topology set use.

Having a means to add a node and indeed remove one at will without upsetting the network as a whole is extremely useful. The present inventors propose herein a means to partition the complexity of the pathways at the edges of the network so that individual instruments being added, removed or moved does not disrupt the network as a whole. Wireless HART networks can take many hours (even days) to find stable and least-cost solutions to all the pathways in use for a particular network. Also remember that as a node is added that the complexity of this decision-making grows as the square of the count of nodes, not linearly as the count.

The present inventors propose that having several instruments represented as sub-instruments of one (as seen from Wireless HART) allows for those sub-instruments to be functionally added or removed (indeed even moved) without interference to the network topology solutions and therefore without time or energy spent on finding new ones.

To do this involves setting instruments to connect to a master device (the present inventors call the control controller or CC) so that device presents these sub-instruments to the network but does not present their added pathways or topology elements. The network sees sub-instruments on the same node it already understands (the CC) and has already provisioned and adapted to as a network as a whole.

Then when devices (in a preferred embodiment Bluetooth-connected wireless devices—connected to the CC) come or go the wireless HART infrastructure sees no topology changes at all, it sees only sub-instruments added or removed from ONE node it already understands.

In this way instruments are added and removed at will without costly and time-consuming network topology/route readjustments.

Installation—Join Process/Association

Field

Many communications devices must associate as a set (typically a pair, but herein more) for controlled communications. This is very common with wireless devices and is often called "pairing". Without such a process (indeed without such a restriction), potentially all devices of the same protocol/technology can indiscriminately communicate together rather than in a membership-controlled group.

This lack of restriction or filter capability, prevents users from having control over which devices are intended to be there and which are not. If there is no form of selection to make an associated set, then other devices can connect, effectively coming and going at will. This promotes all forms of potential security issues, resource scarcity, and lack of control.

An uncontrolled process of association might be okay, even desirable, but in industrial instrumentation (and many other fields) control is needed of who is connected to what, and when for safety and other reasons. This controlled or filtered "associated set" must be constructed from the individual elements or devices which come together at the point of installation and commissioning, and which are selected as needed from potentially the entire population of many often identical others.

The concept of an associated set is intended to allow those within it to communicate AND to deny those outside it from doing so to those within it. This functionality (association) is needed because all the individual devices are originally made identically. Since they are the same there is no method of discriminating those the installer wants to be in the set from those that he wants denied from being there. Potentially this can be done by using some difference inside the devices, for instance devices carry serial numbers (SIM cards or other UIDs and the like) and these can be used to select/reject members of the set. But the installer doesn't always know ahead of time what value these are going to be. He may need to pick the next available device (from a pool of identical ones) and use that to join the associated set. To do so using IDs as a filter requires him to read that ID and to enter that into some user interface on a device of the already partially formed set. In turn this implies a level of user interface (buttons, display) that might not be present and costly to add (picture a Bluetooth ear piece for example). And this approach needs either the external labelling of devices with their IDs (a manufacturing headache of control) or some means of reading that ID from the device at the point of commissioning to form the association. By way of example this is the type of association that happens when a GSM phone is commissioned. The service provider needs someone to read off the SIM card's UEI for the phone (or device) and the service provider provisions that particular device into the set (the large set of allowed devices on that network).

Association for small devices having minimal user interface, is often performed with a minimum user input, typically a button on each of the devices. Those intended to associate as a set, have their buttons actuated contemporaneously. The proximity of both space (close-by in a radio range sense) and time (buttons pressed and still active for a timeout period of a few seconds) provide the indication the installer does want the devices to be in the associated set. This is often how Bluetooth technology implements association.

Other times association is made by software initialization (some program is started) and a key or passphrase typed in at "both ends" (or one end if known to the other) to further confirm the intent to associate.

Background

Problem: In the case where user interface is minimized to just a button, how does the commissioning user know that the process of association of a new device to the set either:
a) Succeeded;
b) Failed; or
c) Is denied.

Knowing the difference between these is important. For instance the "failed" and "is denied" results, need to be differentiated to prevent the installer from repeatedly attempting a "join" to the set (a successful association process is a join) when it may never succeed. The set is maintained by at least three (possibly more) types of actions:
1) Joining (a successful association into the set);
2) Unjoining (leaving, a successful dissociation from the set); and
3) Status/membership report (some way of indicating the active members of the set right now).

If there is not a sufficiently detailed or capable display on the device (its user interface) then relaying this information is extremely difficult, almost impossible, to do.

The present invention is focused around relaying these changes of state of the set when all the device has is a visual indicator like a lamp or LED and nothing else. The present inventors have invented a series of "visual metaphors" that are natural and obvious analogues of joining a group, leaving a group and being denied entry to a group (amongst others signals). The ease of use and uniqueness of this visual metaphor is ground-breaking invention.

To date it has not seemed that from the user's or commissioner's perspective, that there many devices on the market that even needed to associate in a set as such (rather than just a pair). Most consumer space devices just need to manage and indicate the joining of ONE member to another (a set of two). Managing an association to a cohesive set (more than two) is new functionality, which will become increasingly important. Indeed today several Bluetooth devices may associate to a single phone, but they do this entirely from the point of view as single joins of a slave to a master device. Even if the master does have a multiplicity of connections (a multiplicity of pairs) to many devices (headset, car, speaker etc.) the user is interested in one-at-a-time management of those connections, without regard to other existing ones and the concept of a working set is never an issue.

New functionality results when the concept of a set is considered. For instance at Adaptive Wireless Solutions, L.L.C. the IAN (instrument area network) needs to understand and present many instruments behind its façade of being just ONE Wireless HART device. One needs to have a concept of a set to control how that is accomplished—the commissioner/user must also be aware of the elements in the set as they are successfully joined to it. He must be aware because he faces a limit (today 8 devices for example) on devices connected as they consume resources and energy. He needs to be aware of the set because he may have several IAN networks and he want this device on this particular IAN as opposed to a different one (joining). He needs to be aware of the set as he removes a device (to see it truly has unjoined), so further interactions are signaled as known faults (node removed) rather than unknown faults (node not responding). He needs to be aware of the set as he arrives on site the first time to see which devices are handled by which IAN (status/membership report).

The present inventors have invented means of doing all this and more in a very natural (zero documentation) way with a single button interface as input and a single visual interface (LED) as output. The button is in fact another area of invention as it is a force sensor within a sealed explosion-proof enclosure. Having conventional buttons leads to dust, moisture and other gases getting into the unit. Preventing that type of ingress can be extremely expensive. A force sensor does not penetrate the envelope of the device thus maintaining absolute seal. The visual indictors of the present invention are relatively conventional although powering these for high visibility in brilliant sunlight (imagine the Middle East sun at noon literally) is a non-trivial design task.

The following describes . . . a set, management of membership of that set, joining, leaving, status (members) visual metaphor—indicator of sparse capability/single modality (perhaps audio) but rates/patterns can be conveyed . . . such as flashing patterns. Co-ordinated set displaying a cohesive visual pattern(s).

DESCRIPTION OF DRAWINGS

Figure 5:
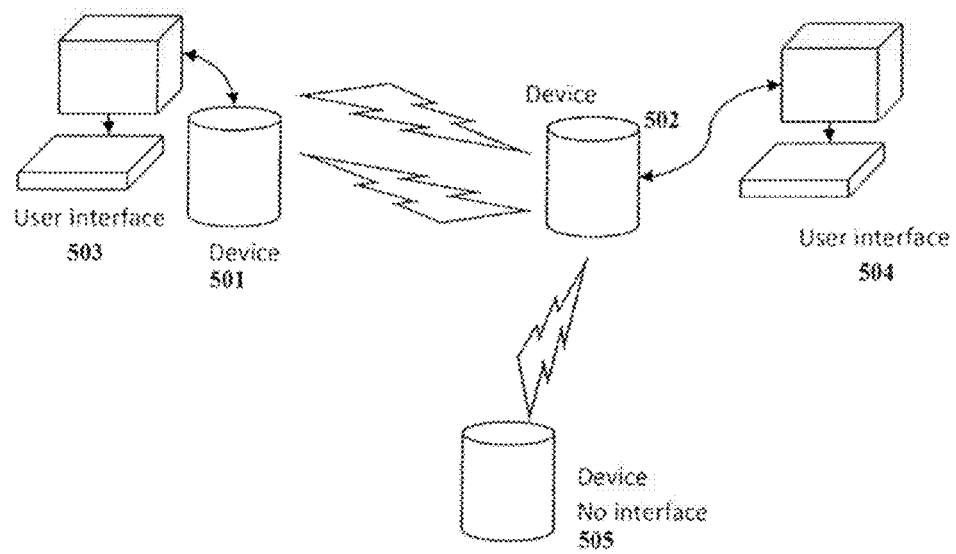
FIG. 5 shows a situation in which a preferred embodiment of the present invention may be used where two devices are communicating with each other to form an association.

FIG. 5 just shows that there are two devices (501 and 502) communicating here by radio and that they wish to form an association. In this conventional scene the devices have high functioning HMI (keyboards and monitors for example) shown as 503 and 504. There is also an additional device without a user interface 505, which is attempting to communicate with 502.

Figure 6:
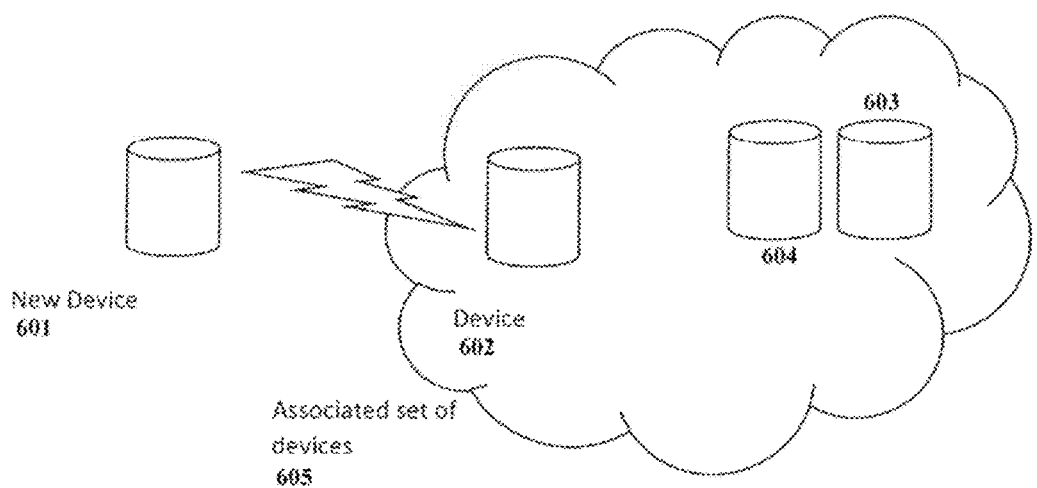
FIG. 6 shows another situation in which a preferred embodiment of the present invention may be used where a group of devices have an association and an outside device is attempting to join.

FIG. 6 is the situation where an associated set (605) already exists (that of 602, 603 and 604). Three devices have previously "joined" into a set 605, the new device 601 is communicating with a member of the set 602 to request permission to join the set 605.

Figure 7:
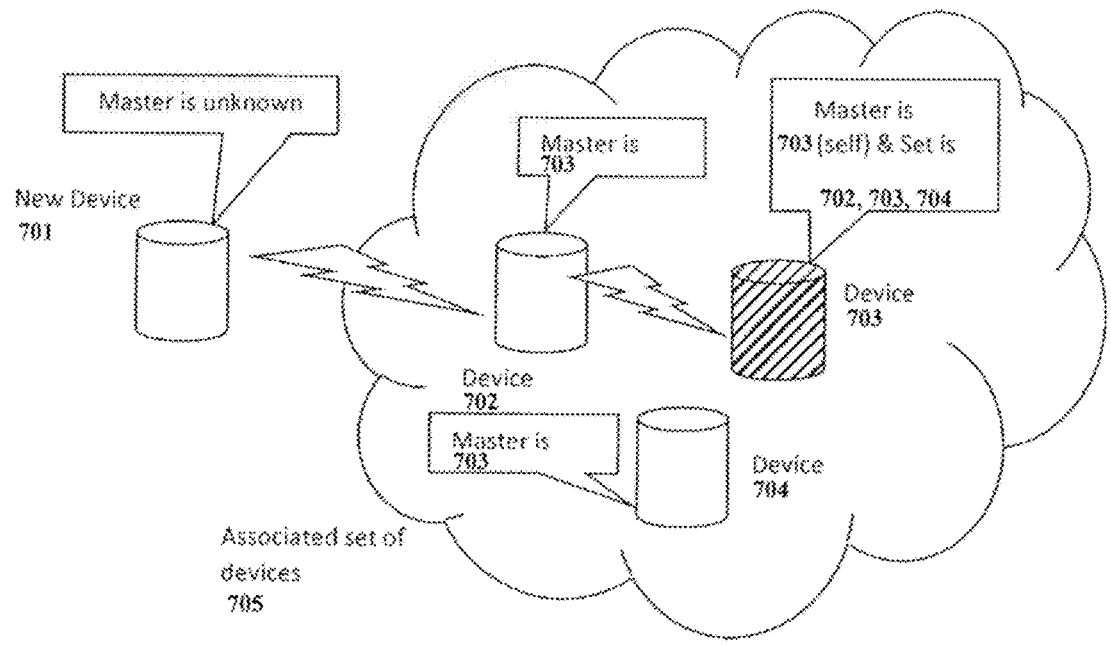
FIGS. 7-9 show another situation in which a preferred embodiment of the present invention may be used where a group of devices have an association with one master and an outside device is trying to join.

FIG. 7 labels and functionally tags devices for further discussions—it highlights (703) as some form of master (if set associations are to be localized). Non masters (like 702, or 704) understand by process that the 703 device is master and relay requests to it for consistent management of change. Device 701 is attempting to join the associated group 705 by communicating with device 702.

Figure 8:
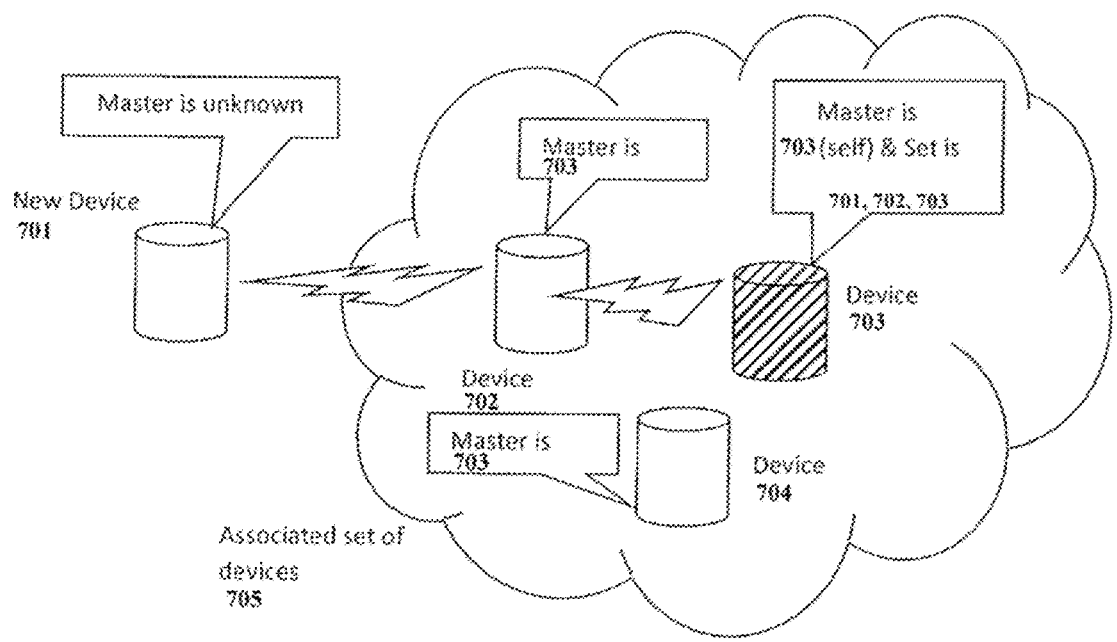

FIG. 8 follows from FIG. 7 and shows the return of information from master 703 to other nodes (devices) 702, 704 in the set 705, and eventually to the new device 701 about who is master when change is being made.

Figure 9:
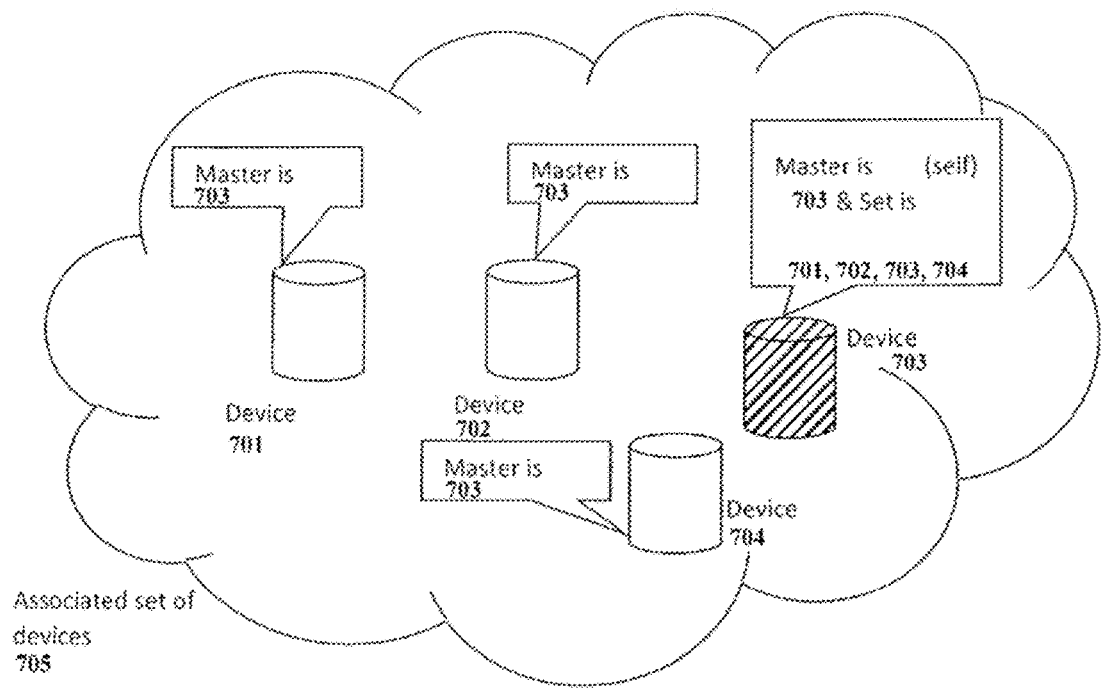

FIG. 9 shows a resulting picture of a set 705 from FIG. 8 as the new node 701 has joined the association 705 knowing the master 703 and its new status.

DETAILED DESCRIPTION

The normal fully functional HMI situation in FIG. 5 is relatively simple. Any devices (501 and 502 for example) can report their understandings of the associations (set members and their conditions) to any user facing one of the monitors 503, 504. Similarly a user at a keyboard and monitor as a user interface (503, 504 for example) can direct the system as a whole to allow/deny/report set membership. The problem arises when a device like 505 with no HMI or user interface, tries to request a particular set function again these represent join/unjoin/status type operations. If 505 has a button and indicator it can attempt some rudimentary "interface."

In FIG. 6 we see the situation where a new device 601 wants to join the existing set 605. But it faces several problems to do so.
  a) To which device of the set does it communicate to ask?
  b) Can that be just one or any of the pre-associated set?
  c) What causes the commands to be issued (button/time/proximity)?
  d) What system is adopted to "open" the set for membership modifications (removes or adds)?
  e) What closes a system from set membership modification (what secures it from unintended or unwanted changes)?
  f) What allows the human doing these types of operations to know they worked/failed?
  g) What can be done to minimize the human's training of these operational steps (NOTE this too is a unique and valuable goal)?

The system has not only these basic issues and questions but preferably must also attempt to be intrinsically obvious to users. These users might never have seen such a system before, or be fully conversant with it, but in all cases the obviousness of join/not join/and leaving a set need simple portrayal if they are to be maximally useful and therefore embody our EOU++ ideas.

We have invented a means of VISUALLY portraying these conditions as flashing lights (leds, bulbs whatever, even passive indicators are ok) and sequences that are visual metaphors of the operations involved.

Now that the speed of actual operations is potentially very fast (faster than a human can perceive) and therefore these can be disjointed from the speed of their portrayal to the user. Separation of the speeds allows the system to go as fast as possible, but humans to see change in their own perceivable time progression—the second to identically but non-lock-step portray the first.

In summary, the visual indicators will preferably progress in sequences to "mimic" the operations and these are at speeds easily followed by humans.

The next sections describe the visual metaphors as invented—they consist of sequences of flashing lights or indicators on the joining, leaving, and associated sets of units under consideration.

Figure 12:
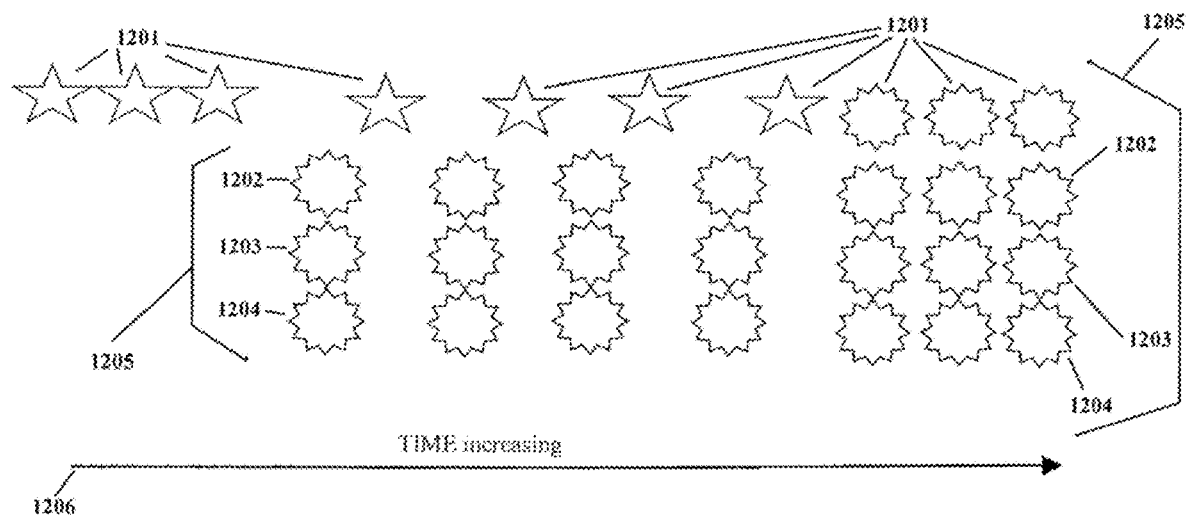
FIG. 12 shows a sequence for an example of another situation in which a preferred embodiment of the present invention may be used where an outside device is joining an associated set of devices.
Figure 13:
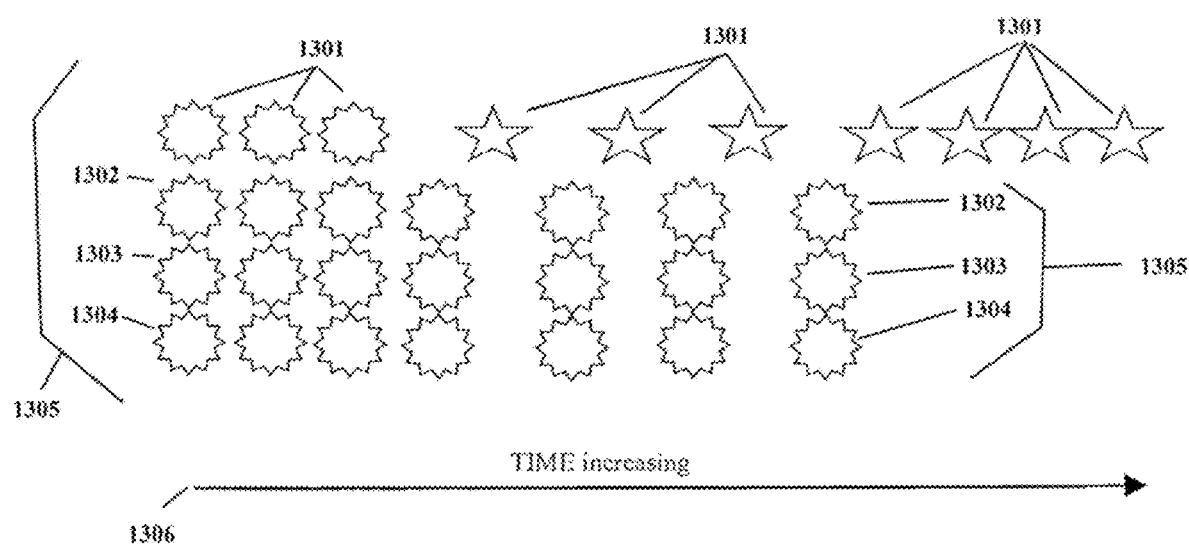
FIG. 13 shows a sequence for an example of another situation in which a preferred embodiment of the present invention may be used where an outside device is leaving an associated set of devices.
Figure 14:
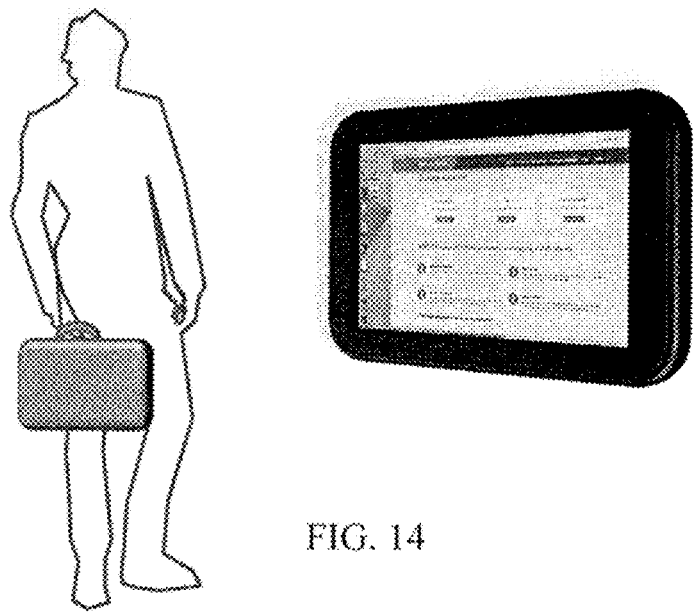
FIG. 14 shows the augmented reality of a preferred embodiment of the present invention.
Figure 15:
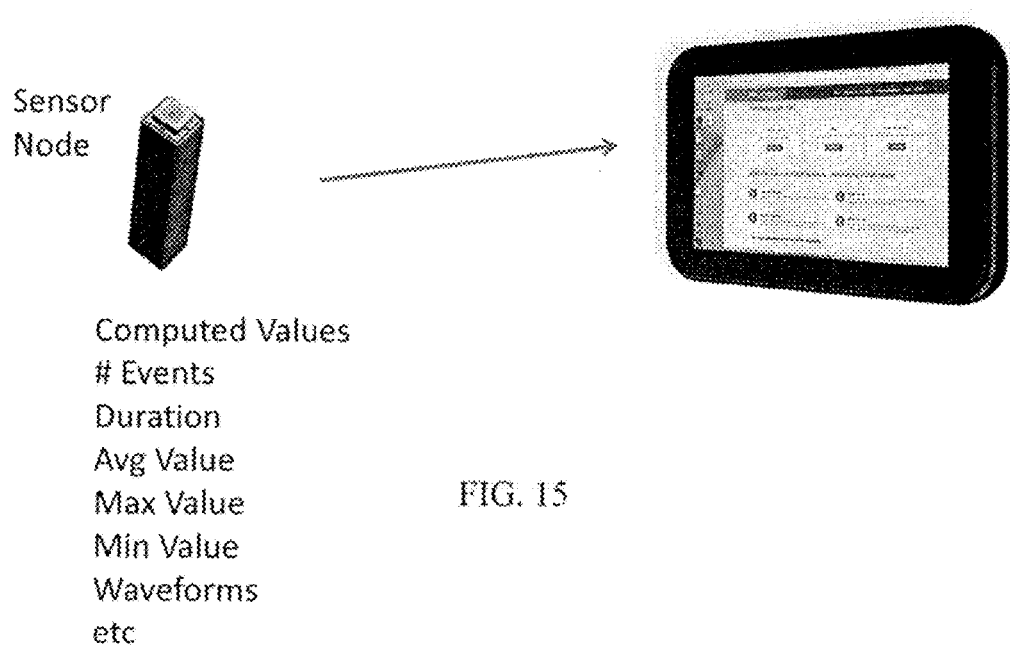
FIG. 15 shows individual nodes with information stored and available for walk-in retrieval of a preferred embodiment of the present invention.
Figure 16:
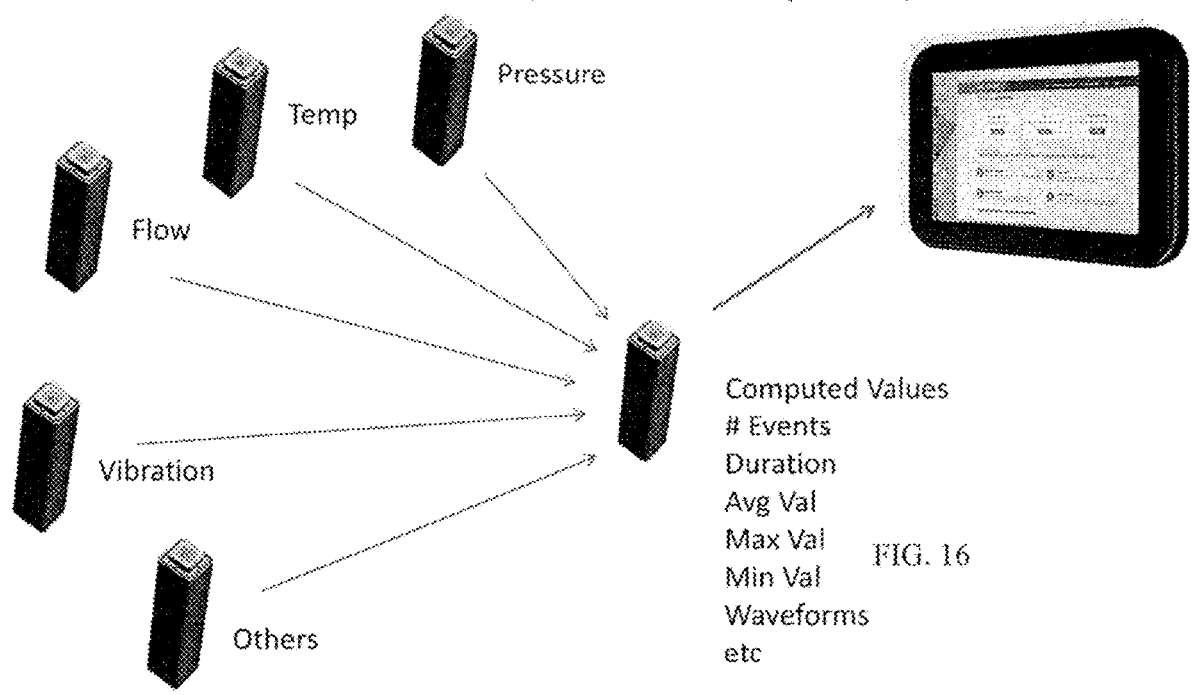
FIG. 16 shows a cluster of nodes of a preferred embodiment of the present invention reporting in an intelligent single point for pre-process.
Figure 17:
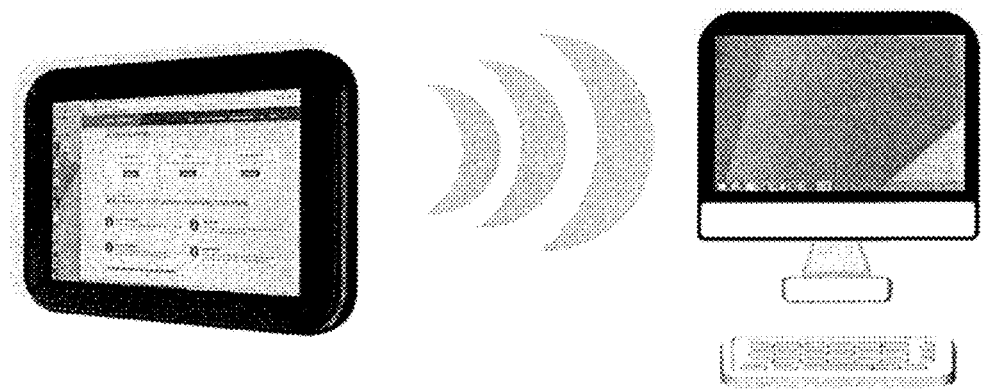
FIG. 17 shows data transferred to a client cloud using of a preferred embodiment of the present invention.
Figure 24:
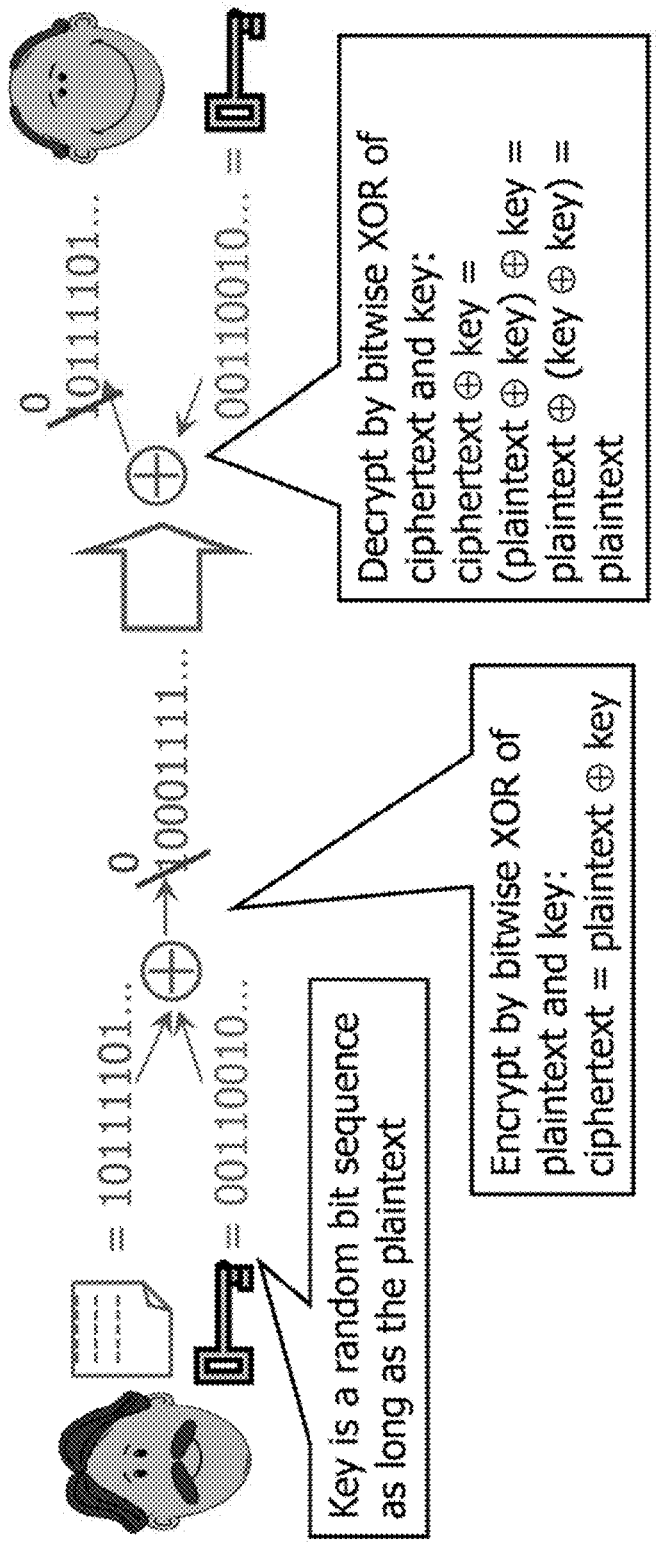
Figure 25:
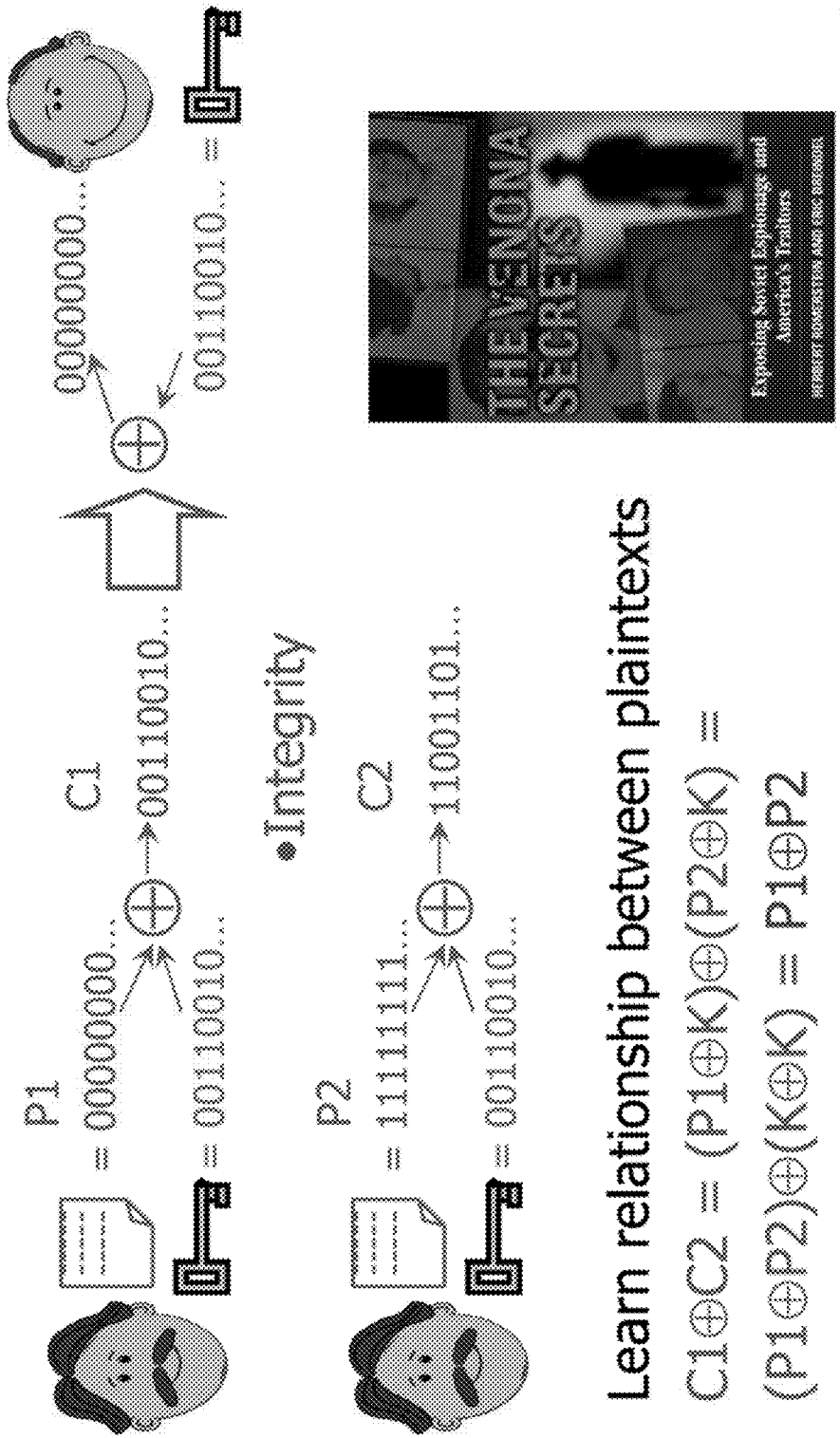
Figure 27:
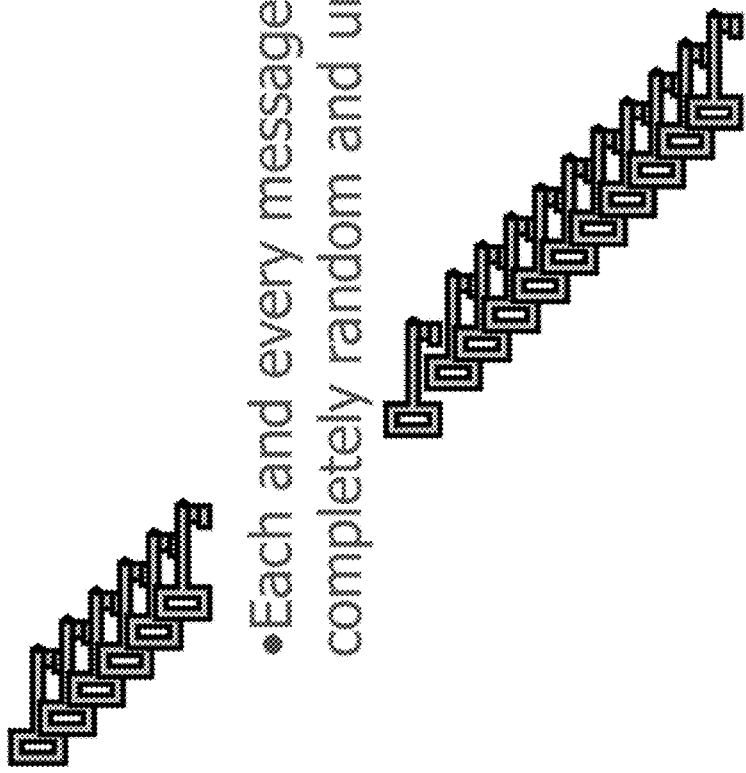
Figure 38:
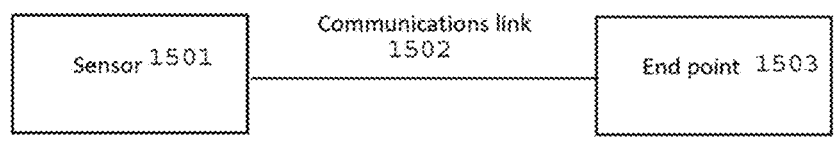
FIG. 38 shows a basic pathway for a preferred embodiment of the improved one time pad encryption of the present invention.

FIGS. 12 and 13

These represent the sequence of flashing visual types for an example of joining set (FIG. 12) and leaving or unjoining a set (FIG. 13).

In FIG. 12 the 5-pointed star shape (5star) 1201 represents the node or device wishing to join the set 1205, the 3 multiple pointed stars or rosettes (Mstars) represent the nodes or devices already in the set 1202, 1203, 1204. As time starts (left edge) 1206 the 5star device 1201 (the one wanting to join) starts to flash on and off (represented by the presence or absence of the 5star). After three flashes like this (alone) the rest of the system (the set already associated 1205) is awakened and starts to also flash—represented by 3 Mstars together 1205 and alternately flashing with the 5star 1201.

This repeats for 4 times total and then the entire group flashes together (not alternately) and more quickly, as a single representation of the group 1205 (larger associated set) to show the join is complete.

In FIG. 13 the opposite situation is depicted, here a member of the group 1305 (top most Mstar) 1301 is leaving. First, at the start of time 1306 all the members 1301, 1302, 1303, 1304 of the group 1305 flash together (shown for three times). Then the pattern changes to only 3 remaining members 1302, 1303, 1304 flashing and a fourth 1301 now alternately flashing (the fourth 1301 is now depicted as a 5star). This repeats 3 more times and then the associated group 1305(3 Mstar) all stop flashing and the unjoined member 1301(5star) flashes alone for 3 more times then activity stops. This represents a node 1301 (top-most here) as part of the associated group 1305 at first, then leaving it and being un-joined.

Augmented Visit Architecture

Background

The advantages of Wireless Sensor Networks (WSN) are well understood for many operators, although the cost of transmission for that wirelessly collected data over the long haul back to monitoring and collection sites may still prove prohibitive and prevent such deployments from returning on the investment as intended. Often the data collection locally has low operational expense (aka opex) as there is no need of a third party long haul provider (who has large infrastructure costs they want to recover). It's the combined cost of sensors AND backhaul together that make the decision to deploy difficult. Operators of wells might for instance like having sensors report to a base radio and be collected together locally as this only needs a onetime capex (capital expense) expenditure, but they may hate having monthly opex for any technology needed for that data to be returned to them for centralization.

If they already deploy human visitors to sites they further see this opex cost for backhaul as unnecessary, they can instead have their staff collect the data manually.

This uneconomic situation arises because of several factors:
a) Sometimes simply there is no low cost sensor for the particular application (especially true if in hazardous areas)—particularly in upstream in oil and gas (O&G) wells where monitoring of low flow rates of injected chemicals is hard to do economically simply due to the difficulty in measurement of such low flows and therefore is very costly;
b) There is no available infrastructure to off-load/backhaul the wireless data from any concentrator or base radio onwards to centralized collection, storage, and analysis; building out one of their own is massively prohibitive.
c) Even when the data is backhauled the opex costs might be prohibitive (and have on-going costs like cellular and/or satellite monthly rates);
d) The potential client already has people physically visiting the site periodically and therefore they can ascertain the core functions or state of the application cheaply and flexibly. In these cases the human visitor can perform readings of the plant values needed and record them on paper or in a simple app on a PC/tablet (any portable computer, including smart phones) for later transcription or downloading. Of course this can be error prone.

The present invention blends automation and radio technology with on-site visits in an economically advantaged, augmented way.

This is preferably done by having radio-connected sensors at the site—but does not require any backhaul of them. Instead their controlling base radio senses the arrival or appearance of a human operator/visitor (or his/her equipment) to the site and reports in to his/her personally carried-in equipment automatically. The sensors or base radios preferably store data for whatever durations are necessary until this visit occurs. That is they preferably retain and secure data until a verified PC/Tablet is on site that is authorized to collect the data, and they preferably verify it has been correctly relayed before erasing any data.

Further it becomes possibly that when a human operator does visit the site, application data preferably can be sent into his/her PC/tablet even without their involvement. This has several advantages:

1) Maintenance staff no longer need worry about forgetting to read a value (regardless of distractions, weather or accessibility), because the sensor/base radio automatically discovers when there's a visit and downloads its own history into the human's PC/Tablet without action on the part of the visiting member of staff—and also it can verify this is ok before releasing the storage of that record. Transfer is a transacted process—avoiding accidental loss of data.

2) A human can easily read the values they know about—but what if new gear was installed (potentially by a third party) and the human operator has simply not been informed yet? Under this approach the augmented read from those new sensors, is automatically added to the others and they all log themselves as "new" into the tablet/PC, with their relevant data sent additionally and automatically.

3) The augmented approach avoids errors in the readings—no mistakes of misreading gauges, etc. The sensors read values without errors and report without making transcription mistakes as human staff are wont to do.

4) Costs are extremely low and there are no added ongoing costs (no opex). The visiting operator can be informed by such a system of needed maintenance or emergency repairs as soon as they arrive and are detected as present on site. In addition the cost of the visit is further lowered as the time spent on site is itself lowered and mistakes avoided (no need for follow-up visits on errors).

5) The time for the operator to perform the readings on-site is reduced. This approach blends the flexibility and low cost of human visits for these types of installations, with the automation and error-free reporting of full wireless solutions.

This blended approach incurs practically no added cost over the regular WSN local collection of data as the discovery and download to the human staff's walk-in device (tablet, etc.) uses the same wireless (potentially) or another low cost separate wireless connection with little or no added hardware devices.

Other Possible Advantages:

The system can be further improved by having the walk-in device (tablet, etc.) have its camera be used by the human operator to "scan" the area before leaving. Such a scan can be video-recorded easily. But more importantly such a scan can have alerts and alarms overlaid on the image for humans to see trouble spots—literally labelled over the video image in front of their eyes.

This video augmentation approach can add valuable and easy-to-use new data forms and new highly informative representations of that data. For instance a sensor could arrange for its value (say when in alarm) to paint a message in red (and green when not) over the area it is sampling when such an area comes into view from the tablet camera on the tablet screen. This is known as "augmented reality"—where the readings are preferably portrayed over the actual image of the real instrument in the location as viewed live through the camera and screen combination of the tablet (et al.). The sensors need only know their own location and report that to the tablet, which we have already allowed for in the design of our sensors. The tablet knows its own location, and from commonly deployed internal sensors all the angles of presentation of the camera (e.g. the compass heading, tilt, etc.). From these basic data the tablet or PC constructs the Virtual Reality image of that scene's actual image, say a well head or other process, with the relevant data overlaid on the same screen, as if "floating" over the relevant device or point.

Inventory management can be done—the sensors reporting in are implicitly telling the operator's tablet that they are alive, well, and operating, and also that the process-point which they are monitoring is at a certain status (so much fluid remains in a tank for instance). In addition the information is physically secure as it never leaves the immediate vicinity unless within the secure tablet/PC (Bluetooth or Wi-Fi power is low so range is low)—the data can be operationally or even cryptographically secured. "Operationally secure" means that even the operator walking in, might not be allowed to read the results (avoids collusion and fraud for instance).

The health of the sensors themselves can be reported to the operator and using a tally of expected reports. Any that do not occur can be flagged such that the operator can investigate and possibly take corrective action in the same visit—avoiding returns and extra expense.

In summary the human operator is there as before with all the flexibility and adaptability that represents—but now their time looking into items better covered by automation is saved and well spent, in addition mistakes and omissions are avoided, alarms are automatic, data transfer is complete and secure and costs are very low. Such human operator staff can visit more sites in the same time as they did before using purely manual visits. Augmentation of the human reporting visit retains the best of both worlds—the flexible fully human visit, and the infallible but expensive fully detailed automatic setup.

More information about the augmented visit system and method of the present invention can be found in FIGS. 14-18.

The present invention also includes a method of partitioning of complexity in wireless instrumentation enclosures. This can be seen in FIG. 37.

Instead of serving all of these functions from one central instrument or requiring multiple instruments in a mesh, this invention partitions the three wireless instrument functions into three separate and optimized devices interconnected via radio. The first device is the sensor, the second is the WSN antenna, the third is the HMI. The radio used to interconnect these devices is free from the technical constraints of the WSN the wireless instrument (antenna partition) needs to serve, and does not need to be the same for each partition interconnect. For example low cost BLE, or high speed WiFi may be used to interconnect the partitions while the WSN services 802.15.4 based low power networks, such as WirelessHART, ISA100.11a, Zigbee, etc.

There are obvious practical advantages for the installer in separating these 3 components, as now he can place each at its own optimal location. Or even carry the HMI in and out of installation as needed.

There is also an advantage in partitioning for the WSN antenna:

Problem: when devices are added or removed from WSN networks like WirelessHART those networks:

a) can become unstable for extended periods of time b) can use excessive stored energy in reconfiguring themselves c) can exhibit undesired behavior as they "hunt" for a solution to the new topology set.

Having a means to add a node and indeed remove one at will without upsetting the network as a whole is extremely useful. Our invention disclosed herein preferably has a means to partition the complexity of the pathways at the edges of the network so that individual instruments being added, removed or moved does not disrupt the network as a whole. It should be noted here that Wireless HART networks can take many hours (even days) to find stable and least cost solutions to all the pathways in sue for a particular network. Also, as a node is added that the complexity of this decision making grows as the square of the count of nodes not linearly as the count.

The present invention preferably has several instruments represented as sub-instruments of one (as seen from Wireless HART) and preferably allows for those sub-instruments to be functionally added or removed (preferably even moved) without interference to the network topology solutions and therefore without time or energy spent on finding new ones.

To do this instruments are preferably set to connect to a master device (herein called the control controller or CC) so that device presents the sub-instruments to the network but preferably does not present their added pathways or topology elements. The network sees sub-instruments on the same node it preferably already understands (the CC) and has already provisioned and adapted to as a network as a whole.

Then, when devices (in a preferred embodiment, Bluetooth connected wireless devices—connected to the CC) come or go, the wireless HART infrastructure preferably sees no topology changes at all, it sees only sub-instruments added or removed from ONE node it already understands.

In this way instruments are added and removed at will without costly and time-consuming network topology/route readjustments.

FIG. 37 shows a pictorial representation of this system set up where the CC 1401 represents the sub-instruments, including an antenna 1402, an HMI 1403, and a sensor 1404.

Parts List

FIG. 1 shows a diagram of a preferred embodiment of the system of the present invention as it might be used in an industrial measurement setting.
- 101—process vessel.
- 102—instrument capable of reading that vessel's (101) internal pressure and relaying it by some means (103) (radio, wires etc.) to a point of use 104.
- 103—is the means of transmission of the process instruments' value to a remote usage location (104).
- 104—is the computer or DCS or other system (even just a display) where the previously read process variable (pressure of 101) is being used to good effect.
- 105—is the calibration, setup, configuration and other data that the controlling computer (or indeed the manufacturer at build time) sends to the instrument to configure the measurement—it resides in the database 302 and is sent to the database 202.

FIG. 2 shows a diagram of the components of the transmitting device 102 of a preferred embodiment of the present invention.
- 200—is the sensor element—this might be a piezoelectric device attached to a boiler to measure pressure for instance.
- 201—is typically an analogue to digital conversion device (typically an IC) which "reads" a voltage or current associated with the output of the sensor (200) and makes that into a data value for further processing. It makes this conversion based on an environment of controlling parameters (205) provided from a database (202) of such parameters stored in the instrument.
- 202—is the database of stored environment parameters critically used in production of the data from raw sensor input (200)—all these parameters potentially affect the validity of the data conversion.
- 203—is a block of hardware or software to calculate the tag which will accompany the data to the receiver. Each and every bit of the parameters in the database (202) must influence the tag's final value so that any change to the same results in a different tag value.
- 204—the data and associated tag are kept as a duplet and rendered to the transmission side of the instrument where they are transported to a receiver.
- 205—controlling parameters, i.e. gain, range, offset, etc.
- 102—is a set of environmental values contained (locally) in database 202 for processing the raw input into a process read value (the Data) for forwarding as part of the data+tag (204)

FIG. 3 shows a diagram of the components of the receiving device 104 of a preferred embodiment of the present invention
- 301—the final data is forwarded to more processing or display elements accompanied with a VALIDITY flag (306) which confirms or alerts the next user section to the data's consistency of production (FIG. 2) compared to its consumption (FIG. 3).
- 302—is the local database of parameters which will be used to verify the data and tag. Which is presumed to exactly mirror the data 102 provided at the sensor for its calculation. The invention critically ensures this is checked for validity or provides indication that something (locally to the sensor in 102, or locally to the DCS in 302) no longer are aligned and consistent as presumed.
- 303—is the signature verification block. This block reads the data and tag (304) along with parameters (305) from a local database (302), of the environment presumed to be used by (102) in the production of the data and tag as in apparatus of Drawing 2.
- 304—The duplet containing the data and associated tag are received and forwarded to a processing element (hardware or software) (303) for validity checking.
- 305—controlling parameters, i.e. gain, range, offset, etc.
- 306—validity.

FIG. 4 shows a diagram of a preferred embodiment of the present invention.
- 101—is an example of a vessel in a plant which is being measured for a process variable (here it might be pressure)
- 102—is an industrial instrument capable of reading that vessel's (101) internal pressure and relaying it by some means (103) (radio, wires etc.) to a point of use 104
- 103—is the means of transmission of the process instruments' value to a remote usage location (104) which may have encryption of its own or not.
- 104—is the computer or DCS or other system (even just a display) where the previously read process variable (pressure of 101) is being used to good effect.
- 405—is the PUBLIC Key, encryption and other data that the controlling computer (or indeed the manufacturer at build time) places into the Key Authority (407) for use by ANY instrument to send signed and encrypted data to it.

406—is the PUBLIC Key, encryption and other data that the instrument (or indeed the manufacturer at build time) places into the Key Authority (407) for use by SENSOR such as (102) for them to send signed and encrypted data to it.

407—key authority 408—is a repository of PUBLIC keys that can be used by any system (instrument or computer or DCS etc.) ALONG with their own PRIVATE keys (placed into them at manufacture or during a commissioning step) to encrypt and sign a message intended for the recipient whose PUBLIC key was provided from this repository. These repositories can be private, public, or of any type suitable for the task.

FIG. 5 shows a diagram of two devices wishing to form an association with one another and a third device wishing to form an association. 501—device wishing to form an association with 502.
- 502—device wishing to form an association with 501.
- 503—user interface for device 501.
- 504—user interface for device 502.
- 505—device wishing to form an association with 502; no interface.

FIG. 6 shows a diagram of a new device trying to join a previously associated set of devices by communicating with one device in the pre-existing set.
- 601—device requesting permission to join associated set of devices (605).
- 602—device in associated set with 603 and 604.
- 603—device in associated set with 602 and 604.
- 604—device in associated set with 602 and 603.
- 605—associated set of devices.

FIG. 7 shows a diagram of a new device trying to join a previously associated set of devices wherein one of the devices in the set is the master and the new device is communicating with a device in the set which is not the master. 701—device wither unknown master requesting permission to join an associated set of devices with a known master.
- 702—device in associated set with 703 and 704 where 703 is the master.
- 703—device master device in associated set with 702 and 704.
- 704—device in associated set with 702 and 703 where 703 is the master.
- 705—associated set of devices with one master.

FIG. 8 shows a diagram of the system of FIG. 7 illustrating the return of information from the master (703) to the other devices in the set and eventually to the new device (701) about who is master when change is being made.
- 701—device wither unknown master requesting permission to join an associated set of devices with a known master.
- 702—device in associated set with 703 and 704 where 703 is the master.
- 703—device master device in associated set with 702 and 704.
- 704—device in associated set with 702 and 703 where 703 is the master.
- 705—associated set of devices with one master.

FIG. 9 shows a diagram of the system of FIGS. 7 and 8 where the new device (701) has been allowed to join the associated set knowing the master (703).
- 701—newest device in associated set with 702, 703, and 704 where 703 is the master.
- 702—device in associated set with 703 and 704 where 703 is the master.
- 703—device master device in associated set with 702 and 704.
- 704—device in associated set with 702 and 703 where 703 is the master.
- 705—associated set of devices with one master.

Figure 10:
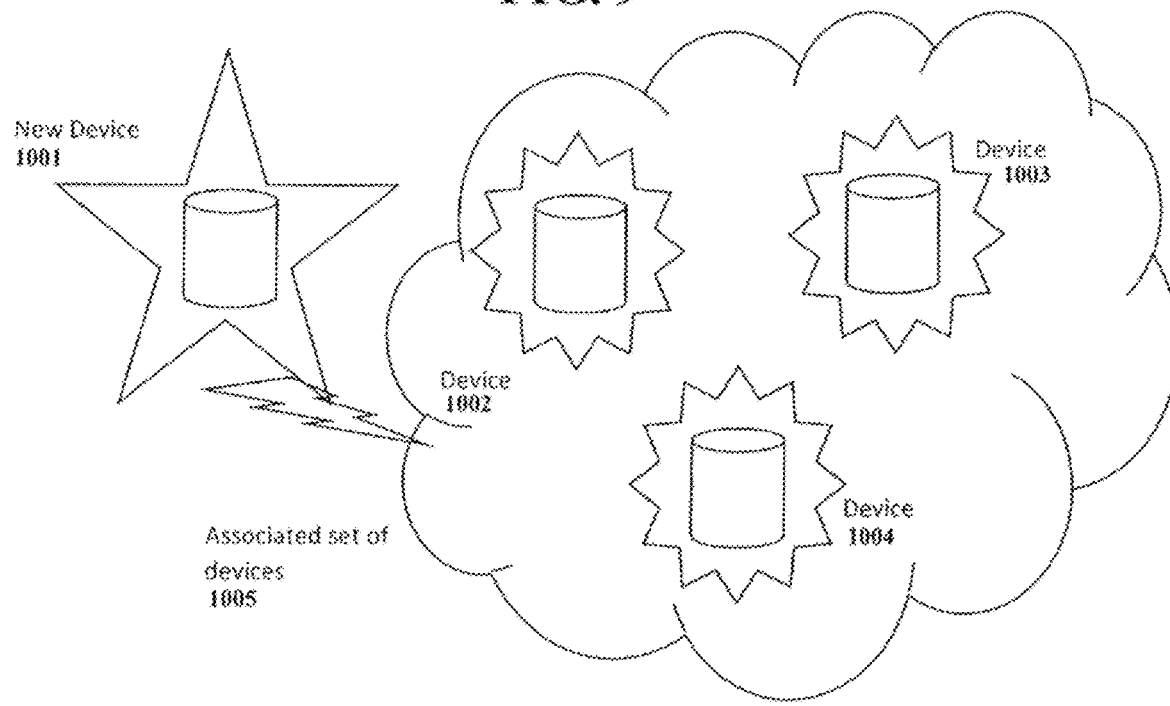
FIGS. 10-11 show another situation in which a preferred embodiment of the present invention may be used where a group of devices have an association and an outside device is attempting to join.

FIG. 10 shows a diagram of a new device requesting permission to join an associated set of devices by communicating with the set as a whole.
- 1001—new device requesting permission to join an associated set of devices.
- 1002—device in an associated set of devices.
- 1003—device in an associated set of devices.
- 1004—device in an associated set of devices.
- 1005—associated set of devices possibly with no master.

Figure 11:
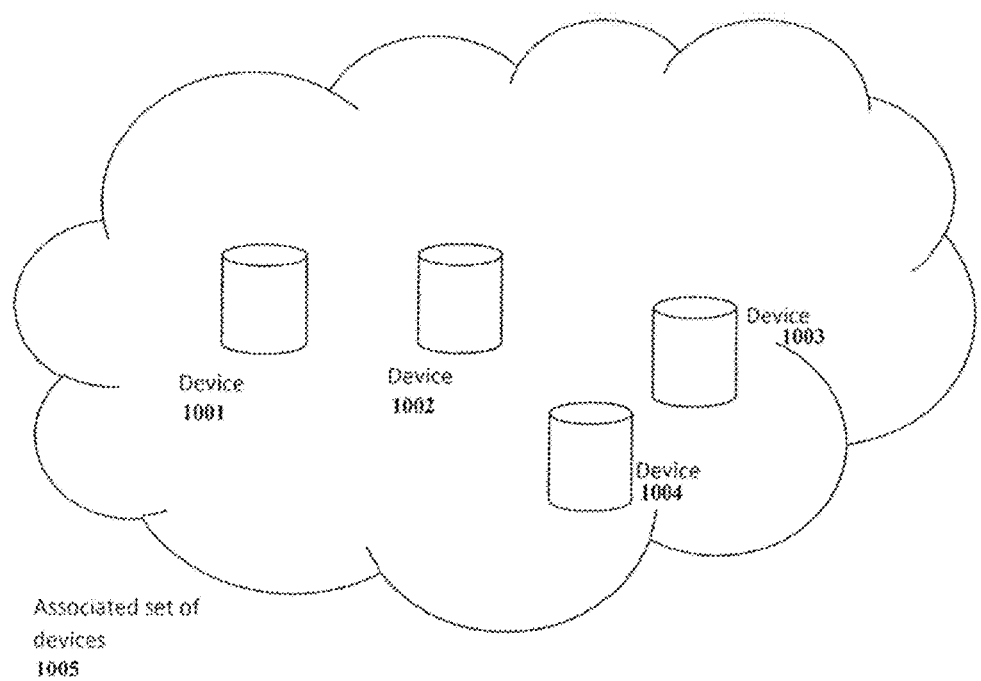

FIG. 11 shows a diagram of the resulting set of devices shown in FIG. 10, where device 1001's request to join has been granted,
- 1001—newest device in associated set of devices.
- 1002—device in an associated set of devices.
- 1003—device in an associated set of devices.
- 1004—device in an associated set of devices.
- 1005—associated set of devices with no master.

FIG. 12 represents the sequence of flashing visual types for an example of joining set.
- 1201 represents the device wishing to join the set 1205. It starts as a 5 star and eventually becomes an M Star when it successfully joins the set 1205.
- 1202, 1203, 1204 represent current members of the set both before and after 1201 joins.
- 1205 represents the set.
- 1206 shows where time begins in the represented sequence.

FIG. 13 represents the sequence of flashing visual types for an example of leaving or unjoining a set.
- 1301 represents the group member leaving the set 1305.
- 1302, 1303, 1304 represent the other members of the group which remain members after 1301 leaves.
- 1305 represents the set or group.
- 1306 shows where time begins in the represented sequence.

FIG. 37 shows a pictorial representation of a preferred embodiment of a method of partitioning of complexity in wireless instrumentation enclosures.
- 1401 represents the CC.
- 1402-1404 represent the sub-instruments of the CC, wherein
- 1402 is the antenna;
- 1403 is the HMI; and,
- 1404 is the sensor.

FIGS. 38-41 show a of the improved one time pad encryption of the present invention wherein:
- 1501 represents a sensor;
- 1502 represents a communication link;
- 1503 represents an end point;
- 1504 represents a result;
- 1505 represents a first OTP;
- 1506 represents a physical parameter stream;
- 1507 represents XOR; and
- 1508 represents a second OTP.

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A method of connecting an instrument to a network, comprising
    functionally connecting a master device to a network;
    routing first data from a network node to the master device using a topology comprising a pathway, having a first end at the network node and a second end at the master device;
    functionally connecting an instrument to the master device;
    representing the instrument to the network as a sub-instrument of the master device;
    functionally connecting the instrument to the network; and
    routing second data from the network node to the instrument using the topology and the pathway, wherein functionally connecting the instrument to the network comprises the network recognizing a connection of a sub-instrument and maintaining the topology used before the instrument was represented to the network.

2. The method of claim 1, wherein functionally connecting the instrument to the network further comprises:
    the instrument visually flashing,
    a set of instruments connected to the network flashing alternately with the instrument, and
    the instrument flashing in sync with the set of instruments to signal a successful joining of the instrument to the set.

3. The method of claim 1, further comprising:
    functionally disconnecting the instrument from the network, wherein functionally disconnecting the instrument from the network comprises:
        members of a set of instruments connected to the network visually flashing together,
        the instrument flashing out of sync with the set of instruments,
        the instrument flashing after the set of instruments ceases to flash.

4. The method of claim 1, further comprising controlling the instrument via the network connection to the master device.

* * * * *